United States Patent
Nelson et al.

(10) Patent No.: US 9,336,647 B2
(45) Date of Patent: May 10, 2016

(54) ATTRACT BASED ON MOBILE DEVICE

(75) Inventors: Dwayne R. Nelson, Las Vegas, NV (US); Steven G. LeMay, Reno, NV (US)

(73) Assignee: IGT, Las Vegas, NV (US)

( * ) Notice: Subject to any disclaimer, the term of this patent is extended or adjusted under 35 U.S.C. 154(b) by 317 days.

(21) Appl. No.: 13/220,430

(22) Filed: Aug. 29, 2011

(65) Prior Publication Data

US 2013/0053148 A1 Feb. 28, 2013

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| G07F 17/32 | (2006.01) |
| A63F 13/30 | (2014.01) |

(52) U.S. Cl.
CPC .............. *G07F 17/323* (2013.01); *A63F 13/12* (2013.01); *G07F 17/3239* (2013.01); *A63F 2300/204* (2013.01)

(58) Field of Classification Search
CPC  A63F 13/12; A63F 2300/204; G07F 17/3239
USPC ................................. 463/20, 25, 42
See application file for complete search history.

(56) References Cited

U.S. PATENT DOCUMENTS

| | | | |
|---|---|---|---|
| 6,676,522 B2 | 1/2004 | Rowe et al. | |
| 7,611,409 B2 | 11/2009 | Muir et al. | |
| 2002/0039919 A1* | 4/2002 | Joshi et al. | 463/20 |
| 2002/0128057 A1* | 9/2002 | Walker et al. | 463/20 |
| 2003/0045354 A1* | 3/2003 | Giobbi | 463/40 |
| 2004/0142739 A1* | 7/2004 | Loose et al. | 463/20 |
| 2006/0148560 A1* | 7/2006 | Arezina et al. | 463/29 |
| 2006/0178212 A1* | 8/2006 | Penzias | 463/37 |
| 2007/0105617 A1* | 5/2007 | Walker et al. | 463/25 |
| 2007/0190494 A1* | 8/2007 | Rosenberg | 434/11 |
| 2007/0202941 A1 | 8/2007 | Miltenberger et al. | |
| 2008/0076572 A1 | 3/2008 | Nguyen et al. | |
| 2008/0113767 A1* | 5/2008 | Nguyen et al. | 463/25 |
| 2008/0167106 A1* | 7/2008 | Lutnick et al. | 463/16 |
| 2008/0200257 A1* | 8/2008 | Stelzer | 463/42 |
| 2008/0311893 A1* | 12/2008 | Liu et al. | 455/414.2 |

(Continued)

OTHER PUBLICATIONS

U.S. Appl. No. 13/156,903, filed Jun. 9, 2011.

(Continued)

*Primary Examiner* — Omkar Deodhar
*Assistant Examiner* — Wei Lee
(74) *Attorney, Agent, or Firm* — Neal, Gerber & Eisenberg LLP

(57) ABSTRACT

A gaming system compatible with patron-controlled portable electronic devices, such as smart phones or tablet computers, is described. The gaming system is configured to detect the presence of portable electronic devices and determine their locations in a casino environment and determine whether to initiate an attract feature. Based on the determined location of the portable electronic device, nearby gaming devices, such as electronic gaming machines can be selected for use in generating an attract feature for a patron. The generated attract feature can include outputting content to one or more EGMs and/or a patron's portable electronic device. The gaming devices selected for use in an attract feature and/or the content associated with the attract feature can be affected by patron specified preferences. In one embodiment, the patron specified preferences can be entered and stored using an application executed on their portable electronic device.

33 Claims, 6 Drawing Sheets

(56) References Cited

U.S. PATENT DOCUMENTS

| | | | |
|---|---|---|---|
| 2008/0318690 A1* | 12/2008 | Walker et al. | 463/42 |
| 2009/0098943 A1 | 4/2009 | Weber et al. | |
| 2009/0118002 A1 | 5/2009 | Lyons et al. | |
| 2009/0239660 A1* | 9/2009 | Acres | 463/25 |
| 2010/0210352 A1* | 8/2010 | Ansari et al. | 463/25 |
| 2011/0195775 A1 | 8/2011 | Wells | |

OTHER PUBLICATIONS

U.S. Appl. No. 13/157,166, filed Jun. 9, 2011.
U.S. Appl. No. 13/217,105, filed Aug. 24, 2011.
U.S. Appl. No. 13/217,110, filed Aug. 24, 2011.
U.S. Appl. No. 13/333,659, filed Dec. 21, 2011.
U.S. Appl. No. 13/333,669, filed Dec. 21, 2011.
U.S. Appl. No. 13/333,679, filed Dec. 21, 2011.
U.S. Appl. No. 13/299,199, filed Nov. 17, 2011.
U.S. Appl. No. 13/333,623, filed Dec. 21, 2011.
U.S. Appl. No. 13/229,494, filed Sep. 9, 2011.
U.S. Appl. No. 13/229,507, filed Sep. 9, 2011.
U.S. Appl. No. 13/229,536, filed Sep. 9, 2011.
U.S. Appl. No. 13/231,275, filed Sep. 13, 2011.
U.S. Appl. No. 13/308,213, filed Nov. 30, 2011.
U.S. Appl. No. 13/308,160, filed Nov. 30, 2011.
U.S. Appl. No. 13/335,652, filed Dec. 22, 2011.
U.S. Appl. No. 13/306,911, filed Nov. 29, 2011.
U.S. Appl. No. 13/361,601, filed Jan. 30, 2012.
U.S. Appl. No. 13/335,613, filed Dec. 22, 2011.
U.S. Appl. No. 13/426/479, filed Mar. 21, 2011.
Search Report from European Patent Office for Application No. 12181485.9 dated Dec. 19, 2012, 6 pages.

* cited by examiner

ATTRACT BASED ON MOBILE DEVICE

BACKGROUND

1. Field of the Described Embodiments

The described embodiments relate generally to gaming systems, such as gaming systems deployed in a casino enterprise. More particularly, apparatus and method for generating attract features related to electronic gaming machines are described.

2. Description of the Related Art

Most patrons enter into a casino with the intention of participating in a wager-based game or at least open to the possibility of participating. A typical casino offers a wide variety of game play choices. The game play choices are offered within a very stimulating auditory and visual environment that is designed to encourage excitement for the typical patron and keep them engaged in game play. However, initially, the wide variety of choices and the stimulating environment can actually provide a barrier to the patron entering into a game play.

From a casino operators perspective it is desirable to maximize the fraction of time that a player participates in gaming activities within the casino relative to the overall time spent within the casino. Thus, once a patron enters into the casino, casino operators desire the patron to quickly decide what game they would like to play and begin playing. To encourage a patron to begin game play, electronic gaming machines (EGMs) include attract features. For instance, on an idle EGM, a visual presentation including accompanying sounds can be output to draw a patron's attention to the device and encourage them to begin a game play session.

In isolation, an EGM providing an attract feature is a good idea. However, in a casino environment where hundreds of gaming machines are located in close proximity to one another, the attract features provided by multiple EGMs simultaneously can actually be annoying and disruptive to patrons. In view of the above, methods and apparatus are desired for implementing attract features in a casino environment.

SUMMARY OF THE DESCRIBED EMBODIMENTS

A gaming system compatible with patron-controlled portable electronic devices, such as smart phones, laptops, netbooks and tablet computers, is described. The gaming system can include gaming devices, such as electronic gaming machines and system servers. The gaming system can be configured to passively track and/or establish active communication sessions with the portable electronic devices. After a location of a portable electronic in a gaming environment, such as a casino, is determined, the system can be configured to initiate an attract feature on one or more nearby electronic gaming machines. The attract feature can include outputting content from the one or more nearby electronic gaming machines. In particular embodiments, the patron's portable electronic device can be used to output content associated with an attract feature.

One or more applications executed on the patron's portable electronic device can be used to gather, store and/or transmit information that can be used in an attract feature. For instance, a feature of an application executed on the portable electronic device can be to determine a relative position of the portable electronic device and transmit the determined position to a remote device, such as a system server within the gaming system. Based on the received location information, the system can determine whether any nearby gaming devices are suitable for generating an attract feature. Another feature can allow a patron to specify preference information related to their gaming activities, such as preferred gaming machine types, preferred games, preferred table games and a preferred denomination for game play. This information can be stored on the portable electronic device and transmitted to gaming devices in the gaming system, such as EGMs or servers. The received preference information can affect whether an attract feature is to be initiated or not. When an attract feature is implemented, the preference information can also be used to select suitable gaming devices to use in an attract feature, such as EGMs that provide capabilities compatible with the patron's specified preferences.

One aspect of the apparatus and methods described herein is related to a method in a gaming system server including a processor, memory and a network interface. The method can be generally characterized as including: a) receiving via the network interface detection information indicating a presence of a portable electronic device in a gaming environment; b) determining a first set of gaming devices including one or more electronic gaming machines near a location of the portable electronic device in the gaming environment; c) determining whether a patron associated with the portable electronic device is engaged in an active game play session; d) when it is determined the patron is not engaged in an active game play session, e) selecting a second set of gaming devices from the first set of gaming devices for use in an attract feature; and f) sending via the network interface instructions and/or data for initiating the attract feature on the second set of gaming devices.

Another aspect of the methods and apparatus is related to a method in a gaming system server including a processor, memory and a network interface. The method can be generally characterized as including a) receiving via the network interface detection information indicating a presence of a portable electronic device in a gaming environment including a unique portable electronic device identifier; b) sending via the network interface instructions and/or data for initiating an attract feature on the portable electronic device wherein the attract feature includes an offer redeemable on an electronic gaming machine; c) sending offer information to the portable electronic device wherein the offer information includes a unique offer identifier and a description of the offer; d) storing the unique offer identifier, the description of the offer and the unique portable electronic device identifier to a memory device, e) receiving information associated with the offer from an electronic gaming machine including an offer identifier and the a portable electronic device identifier, f) validating the offer when i) the unique offer identifier matches the received offer identifier, ii) the unique portable electronic device identifier matches the received portable electronic device identifier and iii) the offer has not been previously redeemed and g) sending to the electronic gaming machine information indicating the offer is valid.

BRIEF DESCRIPTION OF THE DRAWINGS

The embodiments will be readily understood by the following detailed description in conjunction with the accompanying drawings, wherein like reference numerals designate like structural elements, and in which.

DESCRIBED EMBODIMENTS

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

A gaming system compatible with portable electronic devices controlled by users of the gaming system is described. The gaming system can include a number of features that encourage and enable the use of portable electronic devices, such as smart phones, laptops, netbooks and tablet computers, in a casino gaming environment. In particular embodiments, attract features can be triggered on EGMs based upon the detection of a nearby portable electronic device. Further, all or a portion of the attract feature can be output on the portable electronic device.

With respect to the following figures, attract features that can involve interactions between portable electronic devices and EGMs are described. In particular, examples of interactions between system servers, EGMs and portable electronic devices associated with the generation of an attract feature are discussed in regards to FIGS. 1A and 1B. With respect to FIGS. 2A-2F, some examples relating to the output of an attract feature on a portable electronic device are described. Finally, with respect to FIG. 3, a method in a gaming system of implementing an attract feature is described. In one embodiment, the method can be implemented on a system server in the gaming system. With respect to FIGS. 4 and 5, details of electronic gaming machines (EGMs) and a game system that can utilize method and apparatus associated with the attract features is described.

Figure 1A:
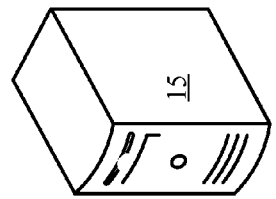
FIGS. 1A and 1B show a block diagram of electronic gaming machines and portable electronic devices in accordance with the described embodiments.
Figure 1A:
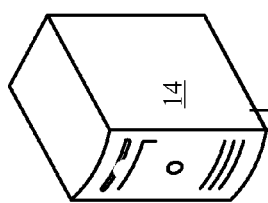
Figure 1B:
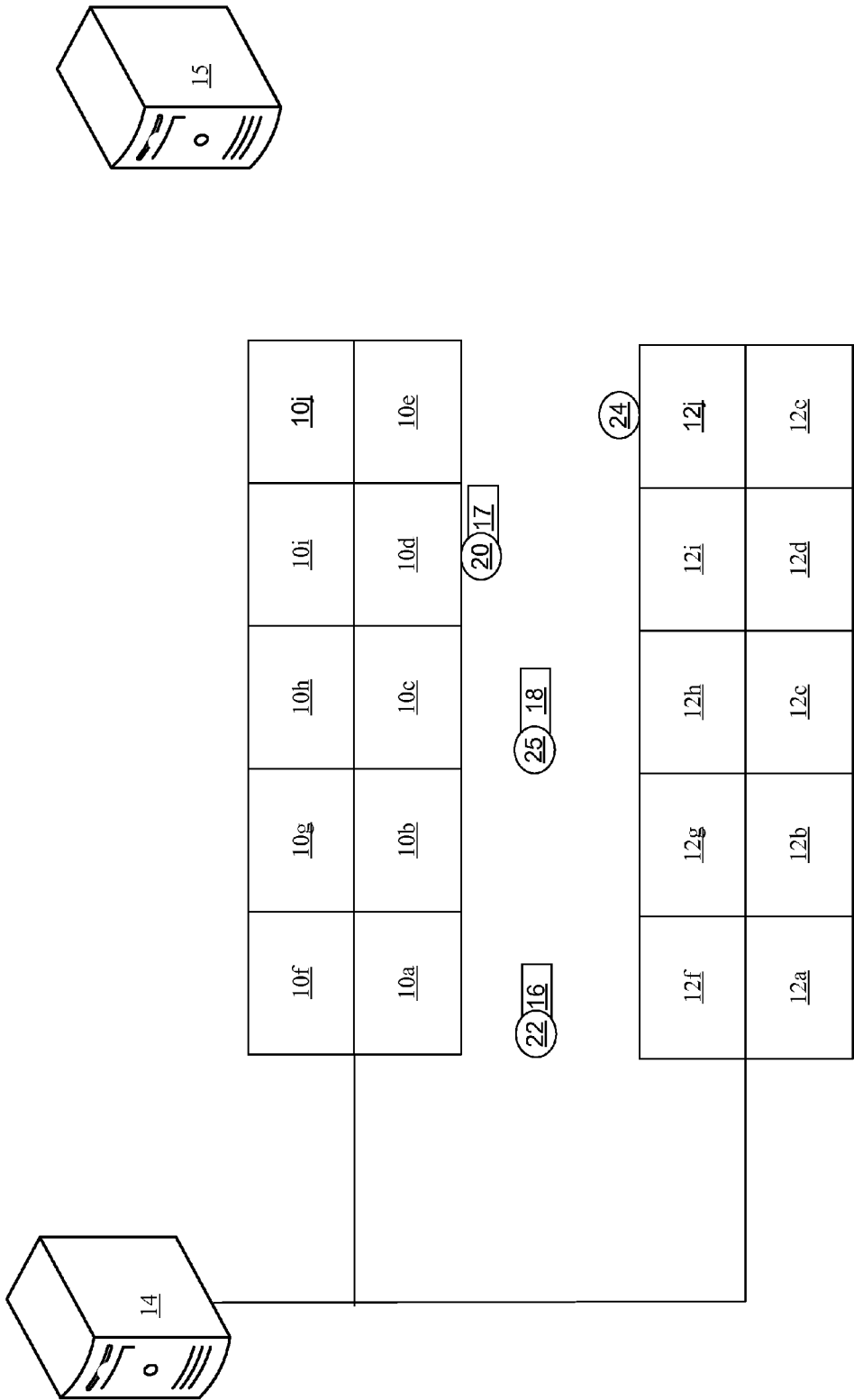

With respect to FIGS. 1A and 1B, examples of devices that can be utilized in a casino environment and general interactions between the devices are discussed. In particular, interactions involving wireless communications and details of a wireless infrastructure for supporting these communications are described. Next, specific interactions between the devices used to implement attract features in accordance with the described embodiments are described.

In FIG. 1A, two banks of electronic gaming machines (EGM) are shown. Ten EGMs, 10a-10f, are placed in the first bank and ten EGMs, 12a-12f, are placed in the second bank. The EGMs can be in wireless or wired communication with one or more remote servers, such as server 14 or server 15. A number of patrons can be located proximate to the EGMs where some of the patrons near the EGMs can be engaging in a game play session. For instance, patron 20 is located near EGM 10d and can be engaging in a game play session on the EGM 10d and patron 24 is located near EGM 10d and can be engaging in a game play session on EGM 12j. Other patrons, such as 22, can be walking or standing near the EGMs but not currently engaged in game play. The patrons not engaged in game play can be carrying portable electronic devices, such as a smart phone, a netbook or a tablet computer. For instance, patron 22 is carrying a portable electronic device 16.

As is discussed in more detail below, it is desirable to direct attract features to patrons, such as 22, not currently engaged in game play. In one embodiment, the attract feature can be triggered at least partly based upon a detection of a portable electronic device carried by the patron, such as device 16 carried by player 22. Other patrons already engaged in game play can also carry portable electronic devices. For instance, patron 20 carrying portable electronic device 17 can already be engaged in game play. It is not necessary to provide this patron an attract feature because they are already engaged in game play. Thus, if the detection of a portable electronic device is used to initiate a determination of whether to generate an attract feature to the patron carrying the portable electronic device, part of the determination of whether to generate attract feature can include an attempt to whether the player carrying the portable electronic device is currently engaged in game play or not.

Wireless Architecture

The attract features can involve the utilization of a wireless architecture since most portable electronic device support wireless communications. Thus, some details of a wireless architecture are described for the purpose of illustration. The EGMs and the servers can be configured to communicate via wireless communications with portable electronic devices. On the EGM, in one embodiment, the wireless communications and subsequent attract features can be controlled by a game controller on the EGM. In other embodiments, a secondary controller on the EGM, such as a secondary controller in a player tracking unit, a card reader, a bill validator or a printer, can be used to control wireless communications and an attract feature involving a portable electronic device independently of the game controller. For instance, a player tracking unit can include its own touch screen video display, audio device and wireless communication capabilities that allow it to implement an attract feature independently of the game controller.

In yet other embodiments, two or more different controllers can be used to implement an attract feature involving a portable electronic device. For instance, a first controller, such a player tracking controller, can handle wireless communications with the portable electronic device. The player tracking controller can forward the communications to a second controller, such as the game controller. In response, the game controller can implement an attract feature on the EGM and possibly communicate with the portable electronic device via the player tracking unit.

The wireless communications can be used to implement various attract features involving one or more EGMs and/or portable electronic devices. To enable wireless communications, all or a portion of the EGMs can each include one or more wireless transceivers. The EGMs can be configured to communicate using the wireless transceivers in a number of different communication protocols depending on the capabilities of the portable electronic device. For instance, communications protocols, such as Bluetooth™, Wi-Fi™ and Near-Field Communication can be implemented on the EGMs. Further details of the capabilities of the EGMs are described with respect to FIGS. 5 and 6.

When implemented, devices implementing the protocols can have different communication ranges. For instance, a class 2, Bluetooth™ device has a range of about 10 meters or less while a low power class 3, device has a range of about 5 meters or less. Near-field communication enabled devices can have a range of about 4 cm or less. Indoors, depending on the obstructions and the version of Wi-Fi that is implemented, the range of a Wi-Fi enabled device can be about 50 meters. Whereas, a cellular communication range can be kilometers. The portable electronic devices described herein can be enabled to simultaneously implement multiple wireless communication protocols and devices, such as EGMs, can be configured to detect and interpret wireless signals formatted in different protocols. As will be discussed in more detail below, the different ranges associated with each protocol can be used, at a first pass, to determine the approximate location of a wirelessly transmitting portable electronic device relative to a receiving device, such as an EGM.

In various embodiments, methods, such as triangulation, signal strength determination and signal analysis can be used to determine an approximate location of portable electronic device within a casino including relative distance of a portable electronic device to other devices within the casino, such as an EGM. A location determination can be performed by a server, such as 14 and 15 and/or an EGM to determine the locations of nearby portable electronic devices. Further, portable electronic devices can be provided with an application that allows it to determine its relative indoor position, such as a position within a casino. The application may utilize information furnished by a casino, such as a floor plan, and the location of wireless signal sources within the casino to determine its relative position within an indoor environment, such as a casino.

A number of wireless access points (not shown) can be provided in the area proximate to the banks of EGMs. As described in the previous paragraph, location information associated with the wireless access points can be provided to portable electronic device used within the casino. In one embodiment, via the wireless access points, a portable electronic device, such as 16, can communicate with a server, such as 14 and 15. In another embodiment, a portable electronic device may be able to communicate with a server, such as 14 and 15, through an intermediary device, such as via an EGM. Besides being used for portable device communication, via the wireless access points, an EGM, such as 10a, may also be to communicate with servers, such as 14 and 15.

In particular embodiments, a plurality of receivers can be located within the casino environment for receiving wireless communication signals, such as 1) the signals that cellular capable devices broadcast to cell phone towers, 2) the signals Wi-Fi™ enabled devices broadcast or 3) the signals Bluetooth™ enabled devices broadcast. In general, wireless signals can be formatted according to many different types of communication protocols. Thus, different receivers configured to receive one or more different types of wireless signals and associated devices that process the wireless signals according to an associated wireless communication protocol can be utilized.

In particular embodiments, wireless receivers of different types, i.e., configured to receive wireless signals in one or more different portions of the wireless spectrum can be incorporated into an EGM. A wireless receiver can be a separate component provided with the EGM or can be built in a device provided with the EGM, such as but not limited to a card reader, bill validator, a player tracking unit or a printer. In some instances, an EGM can include multiple wireless receivers. The data received from the various wireless receivers can be used in a method used to determine the location of a portable electronic device, such as a method involving signal triangulation.

As an example, the cellular data signals can be processed according to a cellular communication protocol, such as GSM or CDMA, to learn information about the device that is broadcasting the information, such as information that allows the cellular enabled device to be identified as a unique node in a cellular network. In one embodiment, one or more of the EGMs can include this capability, i.e., the ability to receive and process cellular data signals in a GSM or a CDMA format. Again, this information can also be utilized for device location and tracking purposes. Further, the information can be used for patron identification purposes if the player has registered unique device information, such as a phone number, with the casino enterprise. As will be described in more detail below, if it is determined that a patron is associated with a portable electronic device, then it may be possible to develop unique attract features based upon information known about the patron.

In some instances, a single device can be configured to broadcast multiple wireless communication protocols simultaneously. In this instance, a wireless device tracking system can be configured to detect a single device in different wireless spectrums simultaneously and perform location estimations, such as triangulation, based on the signals broadcast in the different wireless spectrums. For instance, a single smart phone can be configured to broadcast wireless signals in a cellular portion of the wireless spectrum and a Wi-Fi™ portion of the spectrum simultaneously. A wireless device tracking system can be configured to determine two estimates of its location using each of the two different types of wireless signals that have been received. In one embodiment, the system can be configured to determine which of the two different location estimates is more accurate and select the one determined more accurate for use. In another embodiment, the system can be configured to determine a single location estimate based upon each of the two location estimates. For instance, the two location estimates can be averaged together to provide the single location estimate.

Attract Features

In one embodiment, wireless receivers separate from the EGMs distributed throughout a casino enterprise can be used to detect the presence of portable electronic devices, such as 16 or 17, via their transmitted cellular signals or other types of transmitted radio signals. The wireless receivers can report their signal information to a server, such as 14 and 15. Based upon the information interpreted from the received wireless signals, an approximate position of the portable electronic device within the casino enterprise can be determined, such as a location on a casino floor. In particular, the position of portable electronic devices relative to particular EGMs can be estimated. Over time, this process can be repeated, i.e., the wireless signal environment can be regularly sampled, such that a location history versus time for various portable electronic devices can be determined.

Based upon this positional information determined for the portable electronic devices, a system server can be configured to trigger an attract feature involving one or more devices, such as one or more EGMs. In another embodiment, an EGM can be configured to utilize the positional information to trigger an attract feature. In yet other embodiments, an EGM acting alone or in conjunction with other EGMs via peer-to-peer communications can be configured to detect a nearby portable electronic device and trigger an attract feature independently of a system server. In the following paragraphs, embodiments generally involving attract features triggered by a system server are first described. Then, embodiments generally involving attract features triggered by an EGM are described.

As described above, the portable electronic device can be recognized as belonging to a particular patron. For instance, a patron that is a member of a loyalty program may have registered unique identification information about the device, such as a MAC address and/or a phone number, to a loyalty account with the casino enterprise. The loyalty account can store preference information about the patron such as preferred activities and promotions. The system, which can include servers 14 and 15 and the EGMs, can be configured to determine whether a portable electronic device is associated with a particular patron and if so determine whether any preference information is known about the particular patron, such as preference information stored in the patron's loyalty account. If preference information is known, then this information can be used generate an attract feature for the patron based upon their preferences, such as preferred game types, preferred game denominations, particular games within a game type (e.g., a particular game generated on a video slot machine or a particular game generated on a reel slot machine) or combinations thereof.

In some instances, the portable electronic device may not be recognized as belonging to a patron associated with a loyalty program. Nevertheless, the system can be configured to track the portable electronic device and store information about activities that have taken place near the portable electronic device when it has been detected at a particular location. For instance, if a portable electronic device is determined to be located near an EGM for a period of time during which game play occurred, and the game play is associated with an anonymous or unidentified patron, the system can be configured to associate the game play activity to the portable electronic device as a proxy for the unidentified patron. Thus, when a portable electronic device is detected and it is determined not to be associated with a patron registered with a loyalty program, the system can be configured to store information about activities that have been associated with the identified portable electronic device. This information can be used to determine whether to trigger an attract feature or not and can possibly affect the content of an attract feature.

As part of the determination of whether to trigger an attract feature in response to detecting the electronic device, the system can be configured to determine whether the portable electronic device is associated with a patron currently not engaged in a gaming activity. In one embodiment, the system can use location history information of the portable electronic device to make this determination. For instance, if a position of the portable electronic device has been changing by some amount over some time period then the system may determine that the patron carrying the device is not engaged in a gaming activity. This determination can involve comparing the rate of change of movement to the portable electronic device to a threshold value.

As part of the determination, the system can be configured to query a status of EGMs or other gaming devices near the patron, such as EGMs, 10*a*, 10*b*, 10*c*, 12*f*, 12*g* and 12*h*. When all or a portion of these devices are reporting an idle status, then the system can determine that the patron is not engaged in a gaming activity since no gaming activities is occurring in the vicinity of the detected portable electronic device. Thus, in one embodiment, based upon information received within the gaming system, such as nearby EGM status and portable device positional information, the system can be configured to determine whether the portable electronic device and hence the patron carrying the portable electronic device is a candidate to receive an attract feature. In other embodiment, the system can be configured to trigger an attract feature independently of the movement history of the portable electronic device and/or the status of nearby gaming devices.

In another embodiment, the system can be configured to communicate with an application executing on the portable electronic device, the application can be configured to report accelerometer data and/or positional data to the system, which can be used to determine whether the device is moving or not and hence can indicate whether the patron is engaged in gaming activity. In yet another embodiment, based upon accelerometer data measured by the portable electronic device and wireless data broadcast from devices in the system that is received by the portable electronic device, an application on the portable electronic device can be configured to determine its relative position within a casino. The portable electronic device can be configured to report this position to the system, such as to servers 14 and 15. The patron can be enticed to allow their device to send this information to the system with the possibility of receiving promotions.

In yet another embodiment, the EGMs can be configured to engage in an active communication session with a portable electronic device during a game play session. For instance, EGM 10*d* can be engaged in active communication session with a portable electronic device 17 during a game play session where patron 20 is playing a wager-based game. The EGM 10*d* and/or the portable electronic device 17 can be configured to communicate to the system, such as servers 14 or 15, about the communication session associated with the active game play session. Based upon this information, the system can be configured to determine that the portable electronic device 17 is associated with a patron 20 actively involved in a game play session and thus, not initiate an attract feature on a nearby gaming device for patron 20 based upon this determination.

Other factors which can affect whether to initiate the attract feature or not can be whether the detection of the portable electronic device has recently triggered an attract feature. It might be annoying or creepy to some patrons to have gaming devices, such as the EGMs, constantly initiating attract features as they walk nearby EGMs within a casino. Thus, the system can be configured to enforce a minimum interval period over which attract features can occur. In one embodiment, an application running of the person's electronic device can allow them to opt out of receiving attract features and associated promotions triggered by the detection of a portable electronic device. For instance, the portable electronic device can transmit information to the servers 14 and 15 indicating that the owner of the portable electronic devices wishes or doesn't wish to participate in attract features. As another example, this information can be stored to the patron's loyalty account, which can include the player's wish to opt out of attract features and information regarding the portable electronic device typically carried by the player.

When the system determines a portable electronic device is associated with a patron that doesn't wish to receive attract features, the system can be configured not to trigger attract features on nearby EGMs based upon the detection of the portable electronic device. For instance, if server 14 receives the opt-out information from device 16, it can be configured not to trigger an attract feature. As another example, if EGM 10*a* or 12*f* receives opt-out information from device 16 and is capable of initiating an attract feature based upon detection of device 16, the EGMs can be configured not to trigger an attract feature.

In yet another embodiment, an application running on a portable electronic device, such as 16 or 17, can be configurable with user selectable parameters indicating attract features that are preferred by the user, such as a game type (i.e., mechanical or video slot), a particular game (i.e., a particular game or a game denomination. This information can be broadcast by the portable electronic device and received by system devices, such as a server 15 or an EGM 10*a*. Based upon these settings, a system server or an EGM may only trigger an attract feature when an EGM is nearby that meets the selected criteria. For instance, if the patron has selected parameter(s) in the application that indicates their interest in large jackpot progressive games (i.e., jackpots above a threshold value of 1 million dollars or more), then an attract feature will only be triggered when there is an idle EGM nearby that provides this type of game play. As another example, if the patron has selected parameters in that application that indicates their interest in games of only a dollar denomination then attract features may not be triggered on EGMs that don't meet these criteria. As described above, this information can also be stored to the patron's loyalty account. However, using an application executing on the patron's phone can allow for patron's not registered in a loyalty program to express preferences that can affect an attract feature.

In other embodiments, a patron may be interested in trying a new game. The application on their portable electronic device may allow a patron to select their favorite game or games for which they want to receive attract features. To allow the patron to change their interaction with gaming devices in the casino environment, the application can be configured with selectable parameters exclude preferences that have been previously entered. As an example, after the patron has specified their favorite games, the application can be configured with a selectable parameter, such as generate attract features for EGMs different from their selected favorite games.

In yet other embodiments, the application can be configured to instruct a system server or an EGM to use game play history information stored on portable electronic device or within the gaming system to specify parameters that affect the generation of attract features. In particular, the application executing on the patron's portable electronic device can include a user selectable parameter that instructs an EGM or a system server to exclude certain attract features based upon their game play history. As an example, a patron can select a parameter that instructs the system to generate attract features only EGMs providing games that I have not already played within a time period, such as today, yesterday, last visit, etc. The system can be configured to track information about the patron's recent game play history and generate attract features on EGMs that meet the patron's selected criteria. If the patron's device includes information about the patron's game play history, this information can be uploaded to the system and used in conjunction with user selectable parameters about the game play history to determine whether to trigger an attract feature.

In some instances, the system can be configured to ignore a patron's selected choices, i.e., generate an attract feature on an EGM that doesn't meet their selected criteria. When the system ignores a patron's selections, it may send a message to the patron's electronic device to indicate a reason why their selected parameters have been ignored. For instance, the system can send a message indicating that no EGMs meeting the patron's selections are not currently available but the casino will offer you on attract features on these related devices. The patron's selections may not be available because all the EGMs meeting the patron's selections are currently occupied or a particular game that a patron has selected may not be offered within the casino. In some embodiments, the system may allow the player to accept or not accept the alternate parameters selected by the system for the attract features and opt out as described above or specify new parameters that the system can use to generate attract features for the player.

In another embodiment, a system device, such as a system server or an EGM, can be configured to analyze player data and determine attract features that may interest the player. For instance, if the player always plays a particular denomination machine, the system can be configured to determine this fact and store it. When the system detects a particular player, the analytics based upon the player's game play history, such the denomination of game they typically play or the type game they typically play, can be used to determine an attract feature to offer to the player. This information can also be saved to a loyalty program account associated with player.

Once a decision has been made to initiate an attract feature, the system can determine one or more devices on which to implement the attract feature. For instance, one or more EGMs, such as 10*a*, 10*b*, 10*c*, or 12*f*, 12*g* and 12*h*, can be used in attract feature. As an example, in response to a command received from server 14, EGM 10*a* and EGM 10*c* can each light up with arrows pointing at EGM 10*b*. On EGM 10*b*, a display, lighting devices and/or audio devices can be activated in various manners to draw a patron's attention to the EGM. For instance, on EGM 10*b*, a lighted bezel around the display can flash, the display can output a message or attract content and sounds can be emitted from the speakers. In one embodiment, if multiple devices are used in an attract feature, the sound output can be coordinated on the multiple device. For example, if EGM 10*a*, 10*b* and 10*c* are used to generate an attract feature for EGM 10*b*, then the sound can be turned off or lowered on device 10*a* and 10*c* so that most of the sounds associated with the attract feature originate from device 10*b*.

In particular embodiments, the output message that is displayed on a device, such as an EGM, involved an attract feature can include an offer. For example, a message with an offer can be displayed on EGM 10*b*. The message might say "deposit credits and receive 3 free spins" or "a free spin is on the house." If the offer is not accepted within a particular time period or it is determined that the portable electronic device that triggered the attract feature has been moved from the vicinity of one or more EGMs on which an attract feature has been instantiated, then the attract feature can be discontinued on the one or more EGMs.

In one embodiment, the EGM can be configured to transfer information about the offer by displaying optically formatted image data to a display on the EGM, such as a 1-D bar-code, 2-D bar-code or a QR code. The optically formatted image data can be captured on a portable electronic device. In one embodiment, the optically formatted image data can be optionally parsed and later transferred to another device so that additional information about the offer can be obtained or the offer can be redeemed.

As an example, the offer in an attract feature might include a discount on a casino service. The information can be displayed as optically formatted image data on an EGM. The optically formatted image data can be captured on a user's portable electronic. Then, the parsed data or the optically formatted image data can be uploaded to a remote server. The remote server can validate the data and then, provide additional details on the offer. Further, the remote server can provide information, such as a coupon which allows the offer to be redeemed.

In another embodiment, if the system is able to communicate with a portable electronic device, such as 16, then the portable electronic device can be utilized in the attract feature. As described above, an application, such as a casino specific gaming application, can be installed on the portable electronic device. The application can be used to transfer specific information between the server and the portable electronic device. In one example, described above, the application can send positional information and/or accelerometer data generated on the device to a system server. In another example, a message with an offer can be transmitted from server 14 to portable electronic device, such as go to the one of the flashing machines to see your offer. Simultaneously, the server 14 can send a command to one or more EGMs near portable electronic device 16, such as 10*a*, 10*b*, 10*c*, 12*f*, 12*g* and 12*h*, to enter into an attract state that includes flashing or some other state that the EGM will generate as indicated in the message sent to the portable electronic device. Additional, aspects of implementing an attract feature using a patron's portable electronic device are described in more detail with respect to FIGS. 2A-2F.

When the patron 22 approaches one of the EGMs, a communication can be established between one of the EGMs in an attract state and the patron's portable electronic device. For example, the patron 22 can approach a flashing EGM 12*g* and a wired or wireless communication link can be established between EGM 12*g* and portable electronic device 16. After the communication is established, offer information transmitted from the server 14 to the portable electronic device 16 can be transferred to the EGM 12*g*. For instance, a unique identifier can be transferred from the portable electronic device 16 to the EGM that can be uploaded to a system server and then the system server can download the associated offer information to the EGM. As another example, more complete details of the offer can be transferred from the portable electronic device to the EGM and the EGM, such as 12*g*, can contact server 14 to validate the offer. When the offer is validated, it can be implemented on EGM 12*g*. For instance, two free spins or five promotional credits can be added to EGM 12*g* in response to commands received from server 14. In one embodiment, the patron may not learn about the offer until a communication is established between an EGM and their portable electronic device. An advantage of this approach, as compared to an offer output directly from the display of the EGM, is that another patron for whom the offer wasn't intended can't reach the EGM first and claim the offer or necessarily see offers that other patrons are receiving.

In one embodiment, the offer may be redeemable only on one of the EGMs that a system server, such as 14, has selected to enter into an attract state. For instance, server 14 can select EGMs 10*a*, 10*b*, 12*f* and 12*g* to enter into an attract state where the offer sent to the patron's portable electronic device is only redeemable on one of these EGMs. Thus, if the patron attempts to redeem the offer on EGM 10*c*, which was not selected by the server 14, the offer won't be redeemable. A message can be sent from a system server to a patron's portable electronic device to notify them that the offer is only valid on select machines. For instance, the message can say "Go to one of the nearby flashing machines to redeem offer" and "the offer is only valid for redemption on these machines only."

The message sent to the portable electronic device, such as 16, can be output with an attract feature. For example, the attract feature might be similar to a bonus game on one of the nearby EGMs. The patron can play the bonus game on their device, see what promotion is offered, and then go to a nearby EGM to redeem the offered promotion. In a particular embodiment, the attract feature can be implemented primarily on the patron's portable electronic device. For instance, a promotional message can be output as part of an attract feature on the user's device. The promotional message can include a message and instructions for redeeming an offer included in the message, such as go to a portable electronic device enabled EGM to redeem your offer.

Figure 2A:
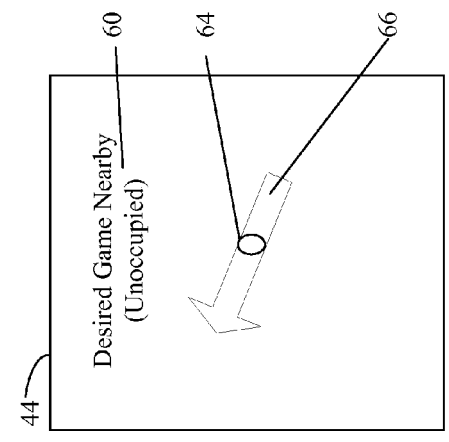
FIGS. 2A-2F are illustrations of visual content output to the display of a portable electronic device in accordance with the described embodiments.

In one embodiment, the server 14 may not cause any of the nearby EGMs to enter into an attract state to draw the patron's attention to the EGM. Instead, the patron can utilize the offer at any nearby EGM that is able to communicate with the portable electronic device. However, a time period might be placed on the offer such that if the offer is not redeemed within the time period it will expire. An attract feature on the portable electronic device can indicate how much time is remaining. For instance, the attract feature can include a countdown timer. An attract feature with a countdown timer is shown in FIG. 2A.

Using an attract feature implemented on the patron's portable electronic device can be used to provide attract features associated with table games. When a patron has indicated that they are interested in attract features for table games via an application executing on their portable electronic device or via an account established with the casino enterprise, such as loyalty program account, the system can be configured to generate an attract feature on their portable electronic device when the portable electronic is detected near a table game of interest. The attract feature can include an attract feature be output on the portable electronic device and can include an offer of some type, such as the house will double your wager on black jack, play for a minimum wager amount lower than the indicated amount at the table (e.g., bet $5 at a $10 minimum table) or make a free bet on roulette. The offer can be triggered when the patron is near a table game. A wireless interface at a table on the table game, such as a near field interface, can be used to receive the offer information and then allow it be validated with the remote server.

In another example, the operator at the table can carry a portable electronic device. The operator can "bump" with the patron's portable electronic device via to initiate a near field communication. The offer information can be transferred to the operators device and validate with a remote server. After validation, the operator's device can output instructions in regards to the promotion that the patron is to be offered. As with other types of offers, attract features involving table games can be implemented independently of whether the patron has specified in interest in table games or not.

The determination of which devices to utilize in an attract feature, such as which EGMs, can depend on a number of different factors. For example, if patron preferences are known, such as preferred game types, game or denominations are known, then whether EGMs near the patron are consistent with the patron selected preferences can affect which devices are selected for an attract feature. For instance, if EGMs 10*a* is the only nearby EGM that meets a patron's selected preferences, then an attract feature can be focused on EGM 10*a*. Even if nearby devices, such as EGM 10*b* and 10*c*, don't meet the patron's attract criteria, these device can be used in an attract feature to direct a patron's attention to EGM 10*a*.

Another factor in selecting devices for an attract feature can be whether the system is able to communicate with the portable electronic device carried by the patron, such as device 16 carried by patron 22. If communication is possible, then the portable electronic device can be utilized in an attract feature alone or in combination with EGMs. Yet another factor can be whether nearby EGMs are occupied or not. The system can be configured to account to add spacing between occupied EGMs and EGMs on which an attract feature is to be implemented. For instance, with EGMs 10*d* and 12*j* occupied, the system can be configured not implement attract features on EGM 10*c*, 10*e* or 12*i* for patron 22 so as not to disturb patrons 20 and 24.

An additional factor can be whether the EGMs are within a line of sight of patron or not. For instance, EGMs 10*a*, 10*b*, 10*c*, 12*f*, 12*g* and 12*h* can be considered in the line of sight of patron 22 based upon the position determined for device 16 while EGMs 10*d*-10*j* and 12*a*-12*e* and 12*i* may not be considered in the line of sight. The line of sight determination can depend on whether any objects are blocking the patron's view, such as EGMs 10*a*-10*c* blocking the patron's view of EGM 10*g* and/or a line of sight angle between the patron and the EGM. For instance, the system can be configured to determine the line of sight angle 21 between the patron 22 and the EGM 12*j* is too small to use EGM 12*j* in an attract feature whereas the line of sight angle for EGMs 12*f*, 12*g* and 12*h* is sufficient.

Another factor can be a movement rate or direction of the patron. As described above, the system can be configured to estimate a speed and/or direction of a portable electronic device, such as via accelerometer data provided from a portable electronic device carried by the user or based upon a history of wireless signals received from the portable electronic device. This information can be used by the system to determine which devices to utilize in an attract feature. For instance, if it is determined that, via device 16, patron 22 is not moving, then EGMs 10*a* or 12*f* can be selected for an attract feature. If it is determined that patron 22 is moving slowly towards patron 20, then EGMs 10*b* and 12*g* slightly ahead of the patron's position can be selected for an attract feature. If it is determined that patron 22 is moving towards patron 20 at a moderate pace, then EGMs 10*c* and 12*h* further ahead of the patron's position can be used in an attract feature. Finally, if it is determined that patron 22 is moving away from the two banks of EGMs, then none of the EGMs in the two banks can be selected for an attract feature. Instead EGMs (not shown), ahead of the patron's position that the patron encounters if they continue to move on their current path can be selected.

Yet another factor in determining which devices to be used in an attract feature can be the presence of other nearby portable electronic devices. In FIG. 1B as compared to FIG. 1A, an additional portable electronic device 18 carried by patron 25 is shown. The position of portable electronic device 16 relative to portable device 18 can affect the devices selected for an attract feature. For instance, if an attract feature is generated for patron 22, then because of the nearby presence of patron 25, one of EGMs 10*a* and 12*f* may only be selected to implement an attract feature. Whereas, if the presence of patron 25 was not detected via device 18, then one or more of EGMs 10*a*, 10*b*, 12*f* and 12*g* can be selected for an attract feature.

To prevent confusion and possible conflict where two patrons view the same attract feature and attempt to play the same EGM, some distance can be implemented between attract features. For instance, if attract features are generated for patron 22 and patron 25 simultaneously then the system can compare the distance between the players to a minimum threshold value and only implement the attract features when the players are separated by a distance greater than the minimum threshold value. For instance, if patron's 22 and 25 are separated by a value greater than the minimum, then a separate attract feature can be initiated for each patron. Whereas, if patron's 22 and 25 are separated by a value greater than minimum then an attract feature can be blocked for both patron's until they both move away from each other. The system can be configured to make an exception to the minimum threshold distance, if it is determined that two portable electronic devices are moving together with one another over some period, such as carried by two patron's associated with one another. Further, the system can be configured to allow a patron to specify information that establishes relationships between portable electronic devices, such as my cell phone is A and my wife's cell phone is B. The determination of whether two portable electronics devices close to one another are associated with related patrons can affect whether to trigger an attract feature or not.

As described above, attract features in the system can be triggered by a server, an EGM or a combination of an EGM and a server. For instance, server 14 can receive and/or generate information regarding the position of portable electronic device 16 and notify nearby EGMs of the devices relative proximity. Then, one of the nearby EGMs can make the determination of whether to trigger an attract feature or not. In another example, one or more of the EGMs near portable electronic device 16, such as EGMs 10*a*, 10*b*, 10*c*, 12*f*, 12*g* and 12*h* can detect portable electronic device 16. The EGMs that detect the device 16 can send a message to server 14 indicating the detection of the device and status information that can affect an attract feature being initiated, such as whether they are idle or not. If the server 14 receives information from two or more nearby EGMs indicating the device 16 has been detected and each device is available for an attract feature, then the server 14 can be configured to select a number of EGMs for an attract feature less than the number of devices from which it received information. For instance, if the server received info from two devices then the server can be configured to only select one of the devices for the attract feature and notify the selected device. As another example, if the server received info from 3 devices then the server may only select 1 or 2 of the devices for an attract feature even if all 3 are available for an attract feature and notify the selected device or devices to implement the attract feature.

In another embodiment, an EGM, such as 10*c*, can detect the presence of a portable electronic device, such as 18, and determine whether to initiate an attract feature or not. The determination of whether to initiate an attract feature upon detecting a portable electronic device can be based on such factors as a signal strength, the strength of the signal detected over some time period, the current status of the EGM (e.g., idle or not), if the EGM is an idle state how long it has been in the idle state and/or combinations thereof. The determination can be made independently of the system server. In yet another embodiment, prior to initiating the attract feature, an EGM can be configured to query nearby EGMs via a peer-to-peer communication. The peer-to-peer communication may request information, such as whether any nearby EGMs detect the same portable electronic device, if the device is detected what is the signal strength, whether any nearby electronic devices have already generated an attract feature in response to the detection of the portable electronic device and whether the nearby EGMs are available to implement an attract feature.

In one embodiment, a group of EGMs can be configured to negotiate among themselves to determine which EGM is to offer an attract feature. For instance, three EGMs, such as 10*a*, 10*b* and 10*c*, can detect a portable electronic device 18. The three devices can exchange signal strength information and it can be decided that 10*c* is to initiate an attract feature because its signal strength is the highest.

In one embodiment, when the portable electronic device is configured to transmit patron preferences, an EGM can receive this information and compare the received information to its configuration to determine whether or not to trigger an attract feature. For instance, When EGM, such as 10*c*, receives information from a portable electronic device, such as 18, indicating the patron prefers one dollar denomination games and the EGM is not a one dollar denomination machine, it can decide not to trigger an attract feature. If the EGM meets the criteria of the information received from the portable electronic device, such as a particular denomination and a particular game, then the EGM can determine in combination with one or more of the parameters described in the preceding paragraph whether to initiate an attract feature.

In yet other embodiments, part of an attract feature can include detecting the presence of casino personnel. For instance, when a customer is offered an attract feature and a casino employee, such as a host, is detected nearby via their portable electronic device, then a message can be sent to the casino employee's portable electronic device to go to the location of the customer's portable electronic device. The message can include information including details about the customer. It can also include information about an offer to be personally made to the customer via a direct communication between the casino employee and the customer. For instance, the casino employee might offer the customer a free drink.

In further embodiments, the system can be configured to attract a casino employee to the vicinity of one or more EGMs for security or maintenance purposes. For instance, EGM include signaling device, such as candle devices on the top of the EGM which are used to draw the attention of a casino employee to a particular EGM. In alternate embodiments, an attract feature involving a detection of the casino employee's portable electronic device and possibly communications with the device can be used to attract the employee to a particular EGM. As another example, an attract feature can be generated to direct a casino employee to the vicinity of an EGM to observe a player for security purposes.

For instance, an attract feature can be generated on an EGM adjacent to the player that is intended for a plain clothes security person. Thus, to the player under observation, it can appear as though a random person is sitting next to them in response to an attract feature as opposed to a security person. In addition, attract features can be suspended in EGMs near the person under observation and activated in surrounding EGMs to draw other customers away from the person that is being observed.

Attract Features on a Portable Electronic Device

As described above, a portable electronic device carried by a patron can be used in an attract feature alone or in conjunction with other gaming devices. The attract feature can involve the portable electronic device receiving commands or instructions from a system server and/or an EGM and outputting attract related content via the portable electronic device. With respect to FIGS. 2A-2F, a few examples of information that can be output to a display screen on a portable electronic device are described. The display information can be accompanied by audio content that is output via speakers on the portable electronic or through an audio interface, such as a head phone interface. The visual and audio content can be output under the control of an application executing on the portable electronic device.

In FIG. 2A, a display 40 on a portable electronic device includes information 52 about an offer associated with an attract feature. In this example, the offer information 52 indicates "3 free spins" are available. The attract feature also includes information 54 about where the attract feature can be redeemed. For instance, the message "Look for the EGM with Flashing Lights," is output to the display. In general, any information that helps the player identify the device can be output. For instance, if a live video feed showing the device selected for the attract feature is available then this video information can be output to the patron's portable electronic device. In another example, a previously taken image of the EGM or EGMs that can be used to redeem an attract feature can be output on the portable electronic device.

As part of the attract feature on the portable electronic device, a time limit is placed on the offer. Thus, the display 40 outputs information 56 and 58 related to the availability of the offer. For example, a message "Time Remaining" 56 and a countdown timer 58 showing a decreasing portion of a circle are output to display 40. This information relating to the availability of the offer can be generated in different formats. For instance, rather than showing a decreasing circle, numerical digits showing the time remaining can be displayed. Thus, the example in FIG. 2A is for the purposes of illustration only and is not meant to be limiting.

In some embodiments, as part of an attract feature, a portable electronic device can be configured to display an indication of how close gaming activities of interest are to the patron. For instance, each EGM can be configured to broadcast information, such as but not limited to the type of gaming machine (e.g., video poker, mechanical slot, video slot, bingo etc.), a denomination (e.g., dollar, quarter, penny, etc.), a type of game (e.g., Wheel of Fortune™ or Megabucks™) and a location (e.g., a location in casino coordinates), its current status (e.g., idle not idle). Table games can also be configured to broadcast this information. The information can be broadcast with a limited range, such as 10 meters or throughout the casino. A patron's portable electronic device can be configured to receive the information and filter it according to parameters selected by the patron, such as the parameters associated with the attract features described above.

As patron walks through the casino, their portable electronic device can receive different signals from different gaming devices, such as EGMs. The portable electronic device can receive and interpret the different signals and then filter the information according to the parameters selected by the patron. In one embodiment, an application executing on the patron's portable electronic device can perform these functions. Then, the portable electronic device can output information of interest to the player. If the information is broadcast from the EGMs or table games over a limited range, then the portable electronic device can output all of the information according to the selected filters that is within range of the device. If the information is broadcast over a wider range, then the portable electronic device can be configurable to allow the patron to select a range of interest to display data, such as a 20 foot radius or a 50 foot radius and the information within the selected range can be output.

In other embodiments, a remote server alone or in conjunction with portable electronic device can determine the portable electronic device's relative position, receive the data filter parameters from the portable electronic device, filter the data according to the received parameters and then send the filtered data to the portable electronic device for output on the display. Some examples of how the filtered data can be displayed are described as follows.

Figure 2B:
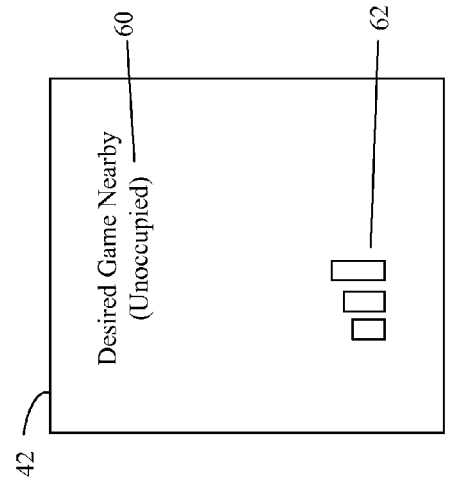

In FIG. 2B, a desired EGM (as specified by the patron) is determined to be nearby the portable electronic device. The status 60 of the EGM is indicated on display 42. In this example, the EGM is unoccupied. A relative closeness of the EGM can be indicated 62. In this example, the relative closeness is indicated by bars. Based upon the signal strength received by the portable electronic device more or less bars can be displayed. Thus, the patron can move the portable electronic device in different directions and more or less bars can be detected. This information can be used to direct the patron to the EGM. Once the patron arrives at the desired EGM, in some instances, an attract feature can be output on the EGM.

Figure 2C:
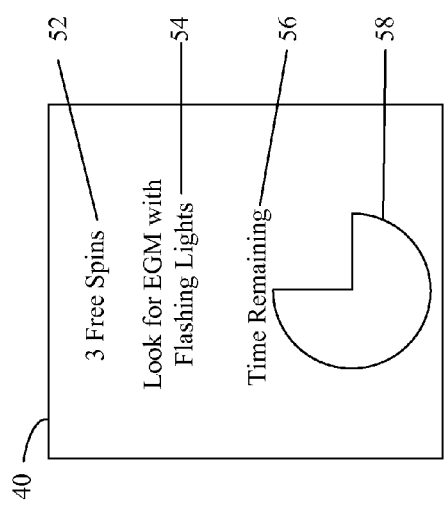

In FIG. 2C, the location of a gaming activity of interest is indicated by an arrow 66 on display 44. In one embodiment, the arrow can point in the direction where the signal strength for the desired device is greatest. Depending on the orientation of the portable electronic device, the arrow 66 can rotate around point 64. In one embodiment, the arrow can grow larger as the detected signal strength increases and smaller as the detected signal strength decreases.

Figure 2D:
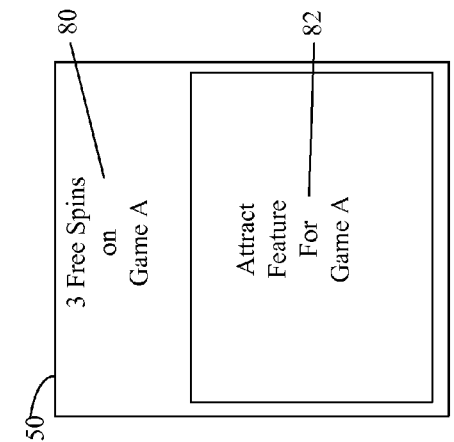
Figure 2E:
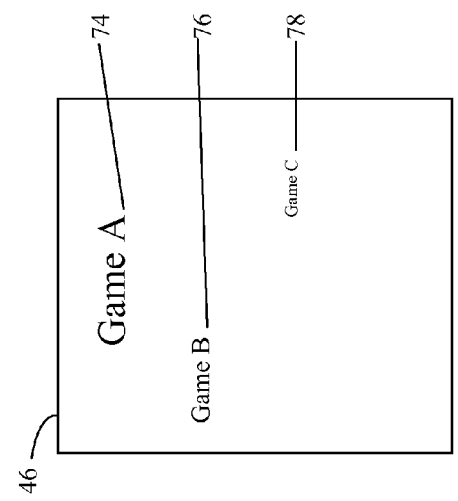
Figure 2F:
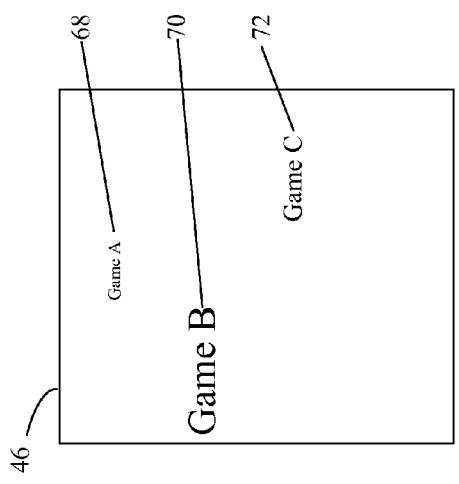

With respect to FIGS. 2D and 2E, an example of displaying information for multiple gaming activities of interest to the patron is discussed. The patron can have specified that 3 games, A, B and C are of interest to the player. The portable electronic device can detect games A, B and C simultaneously and display their positions, 68, 70 and 72, relative to one another on display 46 as an indicator. The indicator can be text, an icon or a symbol or some other type of visual indicator.

The relative closeness of each gaming activity of interest can be represented as a size. In FIG. 2D, "Game B," "Game C," and "Game A" are sized from smallest to largest. This size ordering can be used to represent that "Game B" is closest to the position of the portable electronic device and "Game A" is the farthest away. In FIG. 2E, "Game A," 74 is sized the largest. "Game B" 76 is sized smaller than "Game A" 74 but larger than "Game C" 78. "Game C" 78 is sized the smallest. As compared to FIG. 2D, the sizing of "Game A," "Game B" and "Game C" relative to one another can have changed because the patron has moved in the direction of "Game A" and away from "Game C." As the patron continue to move away from "Game C," it can shrink in size until it is no longer detectable or the portable electronic device has determined that it is farther away than some threshold value. At this time, the indicator for "Game C" may no longer be output on display 46.

After the system and/or the portable electronic device is within some threshold distance of "Game A," the content attract feature that is output can change. For instance, in 50, an offer 80 associated with "Game A" is displayed, such as three free spins. In one embodiment, the offer can be revealed via a presentation that is output. For instance, a bonus game type presentation can be output to display 50 to reveal the offer. In one embodiment, the bonus game type presentation can utilize a theme that is associated with the game for which the attract feature is being provided. For instance, if "Game A," is a Wheel of Fortune™ type game, then the offer can be revealed on the portable electronic device as a wheel spinning and then stopping at an indicator that shows the 3 free spins. This presentation output as 82.

Figure 3:
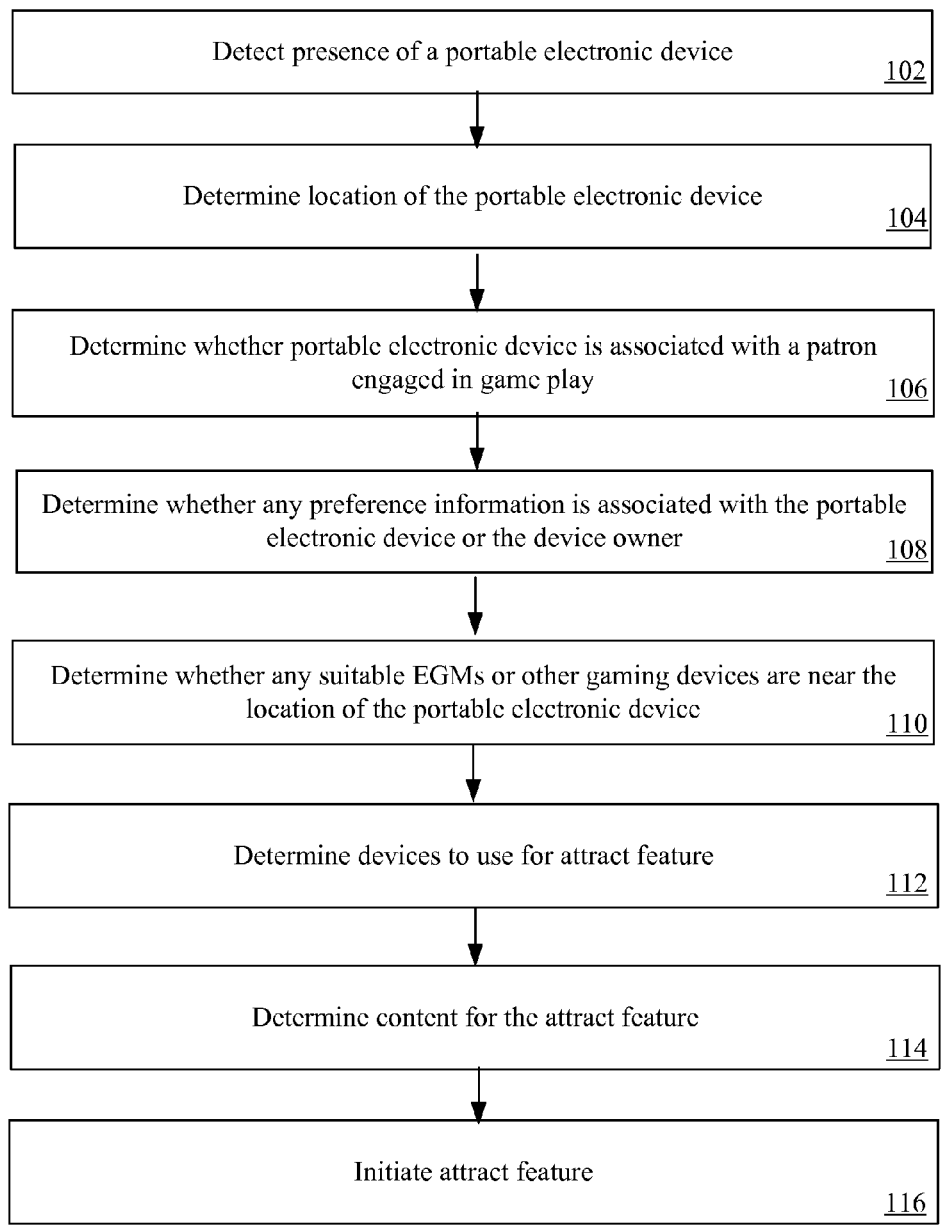
FIG. 3 is flow diagram of a method of generating an attract feature on a system server in accordance with the described embodiments.

Next, with respect to FIG. 3, a method of generating an attract feature on a system server is described. As described above, one or more of the steps in the method can also be performed by an application executing on an EGM or on a portable electronic device. In 102, the presence of a portable electronic device 102 can be detected. As an example, the presence of the portable electronic device can be detected in a gaming environment, such as casino, based upon passive monitoring of wireless signals transmitted from the portable electronic device. An another example, the presence of the portable electronic device can be detected when an active communication session is initiated between the portable electronic device and one or more gaming devices in the gaming system, such as a system server or an EGM.

In 104, a location for the portable electronic device can be determined. The accuracy of the location determination can vary depending upon the method that is used. In one embodiment, the location of the portable electronic device can be estimated based upon wireless signal data gathered from multiple signal receivers within the gaming environment. Methods using triangulation and signal strength can be used to proximate a location. In one embodiment, an application executing on the portable electronic can be configured to determine its location based upon wireless signal data that it is receives. For instance, transmitters at known locations can be set up in a casino that broadcast wireless signal data. The portable electronic device can receive this wireless signal data and determine its relative position within the casino. In a particular embodiment, the system server can be configured to receive a determination of a portable electronic device's location from the portable electronic device.

Position data for a portable electronic device can be determined over time. The position data can be used to determine estimate a velocity for the device and possible predict a future position of the device. In one embodiment, a system server or an EGM can be configured to receive accelerometer data from the portable electronic device. The accelerometer data can be used to determine the velocity of the device and estimate its future position.

In 106, a determination can be made as to whether the portable electronic device is associated with a patron engaged in game play. In some embodiments, the determination can be based upon circumstantial information, such as whether the device has been actively moving over some time period or whether any nearby gaming devices are reporting any gaming activity. In other embodiments, during a game play session, a portable electronic device can be configured to be communicatively coupled to an EGM via wired or wireless connection. In this instance, the EGM and/or the portable electronic device can be configured to report information about the portable electronic device to the system server. In instances where this information is reported, it can be determined that the portable electronic device is associated with a patron engaged in game play. When it is determined that the portable electronic device is associated with a patron engaged in game play, an attract feature may not be initiated. When it is determined the portable electronic device not associated with the patron engaged in game play, then other factors can be considered before an attract feature is initiated as is described as follows.

In 108, it can be determined whether any preference information is associated with the portable electronic device. For instance, information about a portable electronic device can be registered with a loyalty account including patron preference information, such as preferred game types or denominations. When the portable electronic device is detected, it can be determined whether an associated loyalty program account includes preference information. In another example, the portable electronic can be configured to transmit patron preference information to a device in the system, such as an EGM or a system server. An application executed on the portable electronic device can be configured to allow a patron to select and specify various preferences.

In 110, a determination can be made as to whether there are any suitable gaming devices nearby that are available for an attract feature. The determination can be made based upon factors such as whether any nearby EGMs are idle or not and whether any EGMs are consistent with selected patron preferences. For instance, if the patron has indicated that they only like to play progressive jackpot games with awards greater than $100,000, then an attract feature may not be triggered unless any nearby EGMs meet this condition. Another factor that might be considered in regards to whether an EGM is suitable can be whether the candidate EGM is within a line of sight of the patron.

In 112, if suitable EGMs are available for an attract feature then one or more EGMs can be selected for the attract feature. Further, if the portable electronic device is enabled, the portable electronic device can be used in the attract feature. The device selection process can be affected by the game status of nearby EGMs. For instance, the EGMs used for an attract feature can be selected so that there is some space between the EGMs selected for the attract feature and an occupied EGM. Another factor that can be considered is whether any other portable electronic devices have been detected nearby. This factor can be important because it may not be desirable to select an EGM for an attract feature that may possible attract multiple patrons at the same time.

In 114, content can be determined for the attract feature. For instance, an attract feature can include an offer. Thus, parameters of the offer can be determined. In another example, an EGM can be controlled in a particular manner to produce an attract state. Thus, the control parameters for the EGM in the attract state can be determined. In another example, the attract feature can be associated with a particular theme or patron preference and the attract feature content can be selected to match the theme or patron preferences. In yet another example, content consistent with the theme of the EGM or EGMs selected for the attract feature. Thus, a determination can be made of the content to output to the portable electronic device. After the determination is made, instructions or data can be sent to the portable electronic device that enables the determined content for the attract feature to be output.

In 116, an attract feature using the one or more selected devices and selected content for the attract feature can be initiated. For instance, the system server can send instructions or data to the selected devices that allow the selected content to be output. The selected devices can generate the attract features based upon the received instructions or data. Next, details of gaming devices and a gaming system that can incorporate the method described above are discussed with respect to FIGS. 4 and 5.

Figure 4:
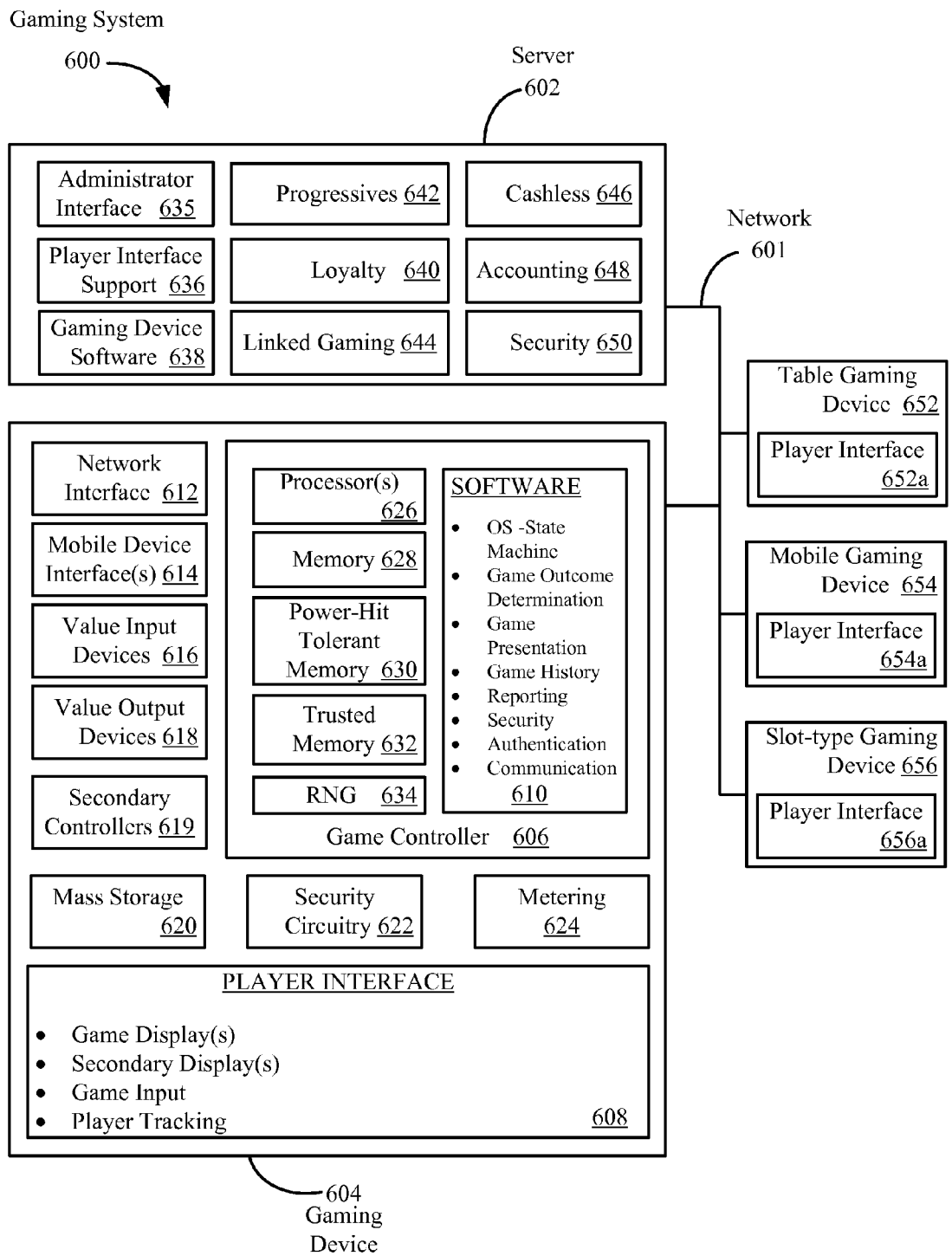
FIG. 4 shows a block diagram of a gaming system including a server and gaming devices in accordance with the described embodiments.

FIG. 4 shows a block diagram of a gaming system 600 in accordance with the described embodiments. The gaming system 600 can include one or more servers, such as server 602, and a variety of gaming devices including but not limited to table gaming devices, such as 652, mobile gaming devices, such as 654, and slot-type gaming devices, such as 656. The table gaming devices, such as 652, can include apparatus associated with table games where a live operator or a virtual operator is employed. The gaming devices and one or more servers can communicate with one another via a network 601. The network can include wired, wireless or a combination of wired and wireless communication connections and associated communication routers.

Some gaming devices, such as 652, 654 and 656, can be configured with a player interface that allows at least 1) selections, such as a wager amount, associated with a wager-based game to be made and 2) an outcome of the wager-based game to be displayed. As an example, gaming devices, 652, 654 and 656, include player interfaces, 652a, 654a and 656a, respectively. Typically, gaming devices with a player interface are located in publically accessible areas, such as a casino floor. On the other hand, some gaming devices, such as server 602, can be located in publically inaccessible areas, such is in a back-room of a casino or even off-site from the casino. Gaming devices located in publically inaccessible areas may not include a player interface. For instance, server 602 does not include a player interface. However, server 602 includes an administrator interface 635 that allows functions associated with the server 602 to be adjusted.

An example configuration of a gaming device is described with respect to gaming device 604. The gaming device 604 can include 1) a game controller 606 for controlling a wager-based game played on the gaming device and 2) a player interface 608 for receiving inputs associated with the wager-based game and for displaying an outcome to the wager-based game. In more detail, the game controller 606 can include a) one or more processors, such as 626, b) memory for holding software executed by the one or more processors, such as 628, c) a power-hit tolerant memory, such as 630, d) one or more trusted memories, such as 632, e) a random number generator and f) a plurality of software applications, 610. The other gaming devices, including table gaming device 652, mobile gaming device 654, slot-type gaming device 656 and server 602, can each include a game controller with all or a portion of the components described with respect to game controller 606.

In particular embodiments, the gaming device can utilize a "state" machine architecture. In a "state" machine architecture critical information in each state is identified and queued for storage to a persistent memory. The architecture doesn't advance to the next state from a current state until all the critical information that is queued for storage for the current state is stored to the persistent memory. Thus, if an error condition occurs between two states, such as a power failure, the gaming device implementing the state machine can likely be restored to its last state prior to the occurrence of the error condition using the critical information associated with its last state stored in the persistent memory. This feature is often called a "roll back" of the gaming device. Examples of critical information can include but are not limited to an outcome determined for a wager-based game, a wager amount made on the wager-based game, an award amount associated with the outcome, credits available on the gaming device and a deposit of credits to the gaming device.

The power-hit tolerant memory 630 can be used as a persistent memory for critical data, such as critical data associated with maintaining a "state" machine on the gaming device. One characteristic of a power-hit tolerant memory 630 is a fast data transfer time. Thus, in the event of a power-failure, which might be indicated by a sudden power fluctuation, the critical data can be quickly loaded from volatile memory, such as RAM associated with the processor 626, into the power-hit tolerant memory 630 and saved.

In one embodiment, the gaming device 605 can be configured to detect power fluctuations and in response, trigger a transfer of critical data from RAM to the power-hit tolerant memory 630. One example of a power-hit tolerant memory 630 is a battery-backed RAM. The battery supplies power to the normally volatile RAM so that in the event of a power failure data is not lost. Thus, a battery-backed RAM is also often referred to as a non-volatile RAM or NV-RAM. An advantage of a battery-backed RAM is that the fast data transfer times associated with a volatile RAM can be obtained.

The trusted memory 632 is typically a read-only memory of some type that may be designed to be unalterable. An EPROM or EEPROM are two types of memory that can be used as a trusted memory 632. The gaming device 604 can include one or more trusted memories. Other types of memories, such as Flash memory, can also be utilized as an unalterable memory and the example of an EPROM or EEPROM is provided for purposes of illustration only.

Prior to installation the contents of a trusted memory, such as 632, can be verified. For instance, a unique identifier, such as a hash value, can be generated on the contents of the memory and then compared to an accepted hash value for the contents of the memory. The memory may not be installed if the generated and accepted hash values do not match. After installation, the gaming device can be configured to check the contents of the trusted memory. For instance, a unique identifier, such as a hash value, can be generated on contents of the trusted memory and compared to an expected value for the unique identifier. If the generated value of the unique identifier and the expected value of the unique identifier don't match, then an error condition can be generated on the gaming device 604. In one embodiment, the error condition can result in the gaming device entering a tilt state where game play is temporarily disabled on the gaming device.

Sometimes verification of software executed on the gaming device 604 can be performed by a regulatory body, such as a government agency. Often software used by a game controller, such as 606, can be highly regulated, where only software approved by a regulatory body is allowed to be executed by the game controller 606. In one embodiment, the trusted memory 632 can store authentication programs and/or authentication data for authenticating the contents of various memories on the gaming device 604. For instance, the trusted memory 632 can store an authentication program that can be used to verify the contents of a mass storage device, such as 620, which can include software executed by the game controller 606.

The random number generator (RNG) 634 can be used to generate random numbers that can be used to determine outcomes for a game of chance played on the gaming device. For instance, for a mechanical or video slot reel type of game, the RNG, in conjunction with a paytable that lists the possible outcomes for a game of chance and the associated awards for each outcome, can be used to generate random numbers for determining reel positions that display the randomly determined outcomes to the wager-based game. In other example, the RNG might be used to randomly select cards for a card game. Typically, as described above, the outcomes generated on a gaming device, such as 604, are considered critical data. Thus, generated outcomes can be stored to the power-hit tolerant memory 630.

Not all gaming devices may be configured to generate their own game outcomes and thus, may not use an RNG for this purpose. In some embodiments, game outcomes can be generated on a remote device, such as server 602, and then transmitted to the gaming device 604 where the outcome and an associated award can be displayed to the player via the player interface 608. For instance, outcomes to a slot-type game or a card game can be generated on server 602 and transmitted to the gaming device 604.

In other embodiments, the gaming device 604 can be used to play central determination games, such as bingo and lottery games. In a central determination game, a pool of game outcomes can be generated and then, particular game outcomes can be selected as needed (e.g., in response to a player requesting to play the central determination game) from the pool of previously generated outcomes. For instance, a pool of game outcomes for a central determination game can be generated and stored on server 602. Next, in response to a request to play the central determination game on gaming device 604, one of the outcomes from the pool can be downloaded to the gaming device 604. A game presentation including the downloaded outcome can be displayed on the gaming device 604.

In other embodiments, thin client type gaming devices, such as mobile gaming devices used to play wager-based video card or video slot games, may be configured to receive at least game outcomes from a remote device and not use an RNG to generate game outcomes locally. The game outcomes can be generated remotely in response to inputs made on the mobile device, such as an input indicating a wager amount and/or an input to initiate the game. This information can be sent from the mobile device to a remote device, such as from mobile gaming device 654 to server 602. After receiving the game outcome from the remote device, a game presentation for the game outcomes generated remotely can be generated and displayed on the mobile device. In some instances, the game presentation can also be generated remotely and then streamed for display to the mobile device.

The game controller 606 can be configured to utilize and execute many different types of software applications 610. Typically, the software applications utilized by the game controller 606 can be highly regulated and may undergo a lengthy approval process before a regulatory body allows the software applications to be utilized on a gaming device deployed in the field, such as in a casino. One type of software application the game controller can utilize is an Operating System (OS). The OS can allow various programs to be loaded for execution by the processor 626, such as programs for implementing a state machine on the gaming device 606. Further, the OS can be used to monitor resource utilization on the gaming device 606. For instance, certain applications, such as applications associated with game outcome generation and game presentation that are executed by the OS can be given higher priority to resources, such as the processor 626 and memory 628, than other applications that can be executing simultaneously on the gaming device.

As previously described, the gaming device 604 can execute software for determining the outcome of a wager-based game and generating a presentation of the determined game outcome including displaying an award for the game. As part of the game outcome presentation one or more of 1) electro-mechanical devices, such as reels or wheels, can be actuated, 2) video content can be output to video displays, 3) sounds can be output to audio devices, 4) haptic responses can be actuated on haptic devices or 5) combinations thereof, can be generated under control of the game controller 606. The peripheral devices used to generate components of the game outcome presentation can be associated with the player interface 608 where the types of devices that are utilized for the player interface 608 can vary from device to device.

To play a game, various inputs can be required. For instance, via input devices coupled to the gaming device 604, a wager amount can be specified, a game can be initiated or a selection of a game choice associated with the play of the game can be made. The software 610 executed by the game controller 606 can be configured to interpret various signals from the input devices, such as signals received from a touch screen controller or input buttons, and affect the game played on the gaming device in accordance with the received input signals. The input devices can also be part of the player interface 608 provided with the gaming device, such as 604.

In other embodiments, the gaming software 610 executed by the game controller 606 can include applications that allow a game history including the results of a number of past games to be stored, such as the previous 10 or 100 games played on the gaming device 604. The game history can be stored to a persistent memory including but not limited to the power-hit tolerant memory 630. The gaming controller 606 can configured to provide a menu (typically, only operator accessible), that allows the results of a past game to be displayed via the player interface 608. The output from the history menu can include a re-creation of the game presentation associated with a past game outcome, such as a video representation of card hand associated with a video poker game, a video representation of a reel configuration associated with a video slot game, and/or raw data associated with the past game result, such as an award amount, an amount wagered, etc. The history menu can be used for dispute resolution purposes, such as if a player complains that they have not been properly awarded for a game previously played on the gaming device 604.

The reporting software can be used by the game controller 606 to report events that have occurred on the gaming device 604 to remote device, such as server 602. For instance, in one embodiment, the game controller 606 can be configured to report error conditions that have been detected on the gaming device 604, such as if a device has malfunctioned or needs attention. For instance, the reporting software can be used to send a message from the gaming device 604 to the server 602 indicating that a printer on the gaming device needs a refill of tickets. In another embodiment, the gaming controller 606 can be configured to report security events that may have occurred on the gaming device 604, such as but not limited to if a door is opened, a latch is activated or an interior portion of the gaming device 604 has been accessed.

In yet other embodiments, the game controller 606 can be configured to report gaming activity and associated events that has been generated on the gaming device, such as a deposit of cash or an indicia of credit, at the gaming device, a generation of game outcome including an associated award amount and a dispensation of cash or an indicia of credit from the gaming device 604. As part of a loyalty program, the gaming activity can be associated with a particular player. The reporting software can include player tracking elements that allow the gaming activity of a particular player to be reported to a remote device, such as server 602.

The game controller 606 can execute the authentication software to verify the authenticity of data and/or software programs executed on the gaming device 604. For instance, the authentication software can be used to verify the authenticity of data and/or software applications when they are first downloaded to the gaming device 604. Further, the authentication software can be used to periodically verify the authenticity of data and/or software applications currently residing on the gaming device, such as software applications stored on one of the memories coupled to the gaming device 604 including applications loaded into the memory 628 for execution by the processor 626.

The communication software executed by the game controller 606 can be used to communicate with a variety of devices remote to the gaming device 604. For instance, the communication software can be used to communicate with one or more of a) servers remote to the device, such as 602, b) other gaming devices, such as table gaming device 652, mobile gaming device 654 and slot-type gaming device 656 and c) mobile devices carried by casino personnel or players in the vicinity of the gaming device 604. Via the communication software, the game controller can be configured to communicate via many different communication protocols. For instance, different wireless and/or wired communication protocols can be implemented. Further, proprietary or non-proprietary gaming specific protocols can be implemented. For instance, gaming specific non-proprietary communication protocols, such as G2S (game to system), GDS (gaming device standard) and S2S (system to system) communication protocols provided by the Gaming Standards Association (GSA), Fremont, Calif., can be implemented on the gaming devices described herein.

The gaming device 604 can communicate with one or more remote devices via one or more network interfaces, such as 612. For instance, via network interfaces 612 and the network 601, the gaming device 604 can communicate with other gaming devices, such as server 602 and/or gaming devices, 652, 654 and 656. The network interfaces can provide wired or wireless communications pathways for the gaming device 604. Some gaming devices may not include a network interface or can be configured to operate in a stand-alone mode where the network interface is not connected to a network.

In other embodiments, a mobile device interface or interfaces, such as 614, can be provided for communicating with a mobile device, such as a cell phone or a tablet computer carried by players or casino personnel temporarily in the vicinity of the gaming device 604. A wireless communication protocol, such as Bluetooth™ and a Wi-Fi compatible standard, can be used for communicating with the mobile devices via the mobile device interfaces 614. In one embodiment, the mobile device interface can implement a short range communication protocol, such as a near-field communication (NFC) protocol used for mobile wallet applications. NFC is typically used for communication distances of 4 cm or less. In addition, a wired communication interface, such as a docking station, can be integrated into the gaming device, such as 604. The wired communication interface can be configured to provide communications between the gaming device 604 and the mobile device and/or providing power to the mobile device.

Near field communication, or NFC, allows for simplified transactions, data exchange, and connections with a touch. Formed in 2004, the Near Field Communication Forum (NFC Forum) promotes sharing, pairing, and transactions between NFC devices and develops and certifies device compliance with NFC standards. NFC's short range helps keep encrypted identity documents private. Thus, a smartphone or tablet with an NFC chip can make a credit card/debit card payment to a gaming device or serve as keycard or ID card for a loyalty program. Further, an NFC device can act a hotel room key. The user of an NFC device as a hotel room keys and/or a player tracking card instrument may allow fast VIP check-in and reduce staffing requirements.

NFC devices can read NFC tags on a gaming device 604 to get more information about the gaming device including an audio or video presentation. For instance, a tap of an NFC enabled device to a gaming device can be used to instantly share a contact, photo, song, application, video, or website link. In another example, an NFC enabled device can be used to transfer funds to the gaming device or enter the player in a multi-player tournament. As another example, an NFC enabled device can be used to receive information from a gaming device that can be used in a persistent gaming application or a social media application.

Further, NFC enabled signage can include NFC tags that allow a patron to learn more information about the content advertised in the signage. The NFC enabled signage can be part of a gaming system. For instance, a sign advertising a show available at the casino can be configured to transfer information about the show, show times and ticketing information via an NFC tag. As another example, a sign showing jackpot information, such as progressive jackpot information, can be used to transfer information about the jackpot, such as the last time the jackpot was won and where it was won.

In one embodiment, an NFC interface on a gaming device can be used to set-up a higher speed communication between the gaming device and another NFC enabled device such as smart phone. The higher speed communication rates can be used for expanded content sharing. For instance, a NFC and Bluetooth enabled gaming device can be tapped by an NFC and Bluetooth enabled smart phone for instant Bluetooth pairing between the devices. Instant Bluetooth pairing between a gaming device and an NFC enabled device, such as a smartphone, can save searching, waiting, and entering codes. In another example, a gaming device can be configured as an NFC enabled router, such as a router supporting a Wi-Fi communication standard. Tapping an NFC enabled device to an NFC enabled and Wi-Fi enabled gaming device can be used to establish a Wi-Fi connection between the two devices.

As an example, the NFC communication can be used to exchange information to allow pairing to be established between a user-controlled device and the gaming device 604. For instance, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol allows for a Wi-Fi device pair directly with another without having to first join a local network. The method makes it possible to share media from a phone, play multiplayer games or otherwise communicate directly, even when no router exists. Via pairing between the gaming device 604 and portable electronic device, a portable electronic device may be able to utilize some of the functionality of secondary devices residing on the gaming device 604. For instance, it may be possible for a player to print something from their portable electronic device using the printer on the gaming device 604 when it is paired to the gaming device 604.

Figure 5:
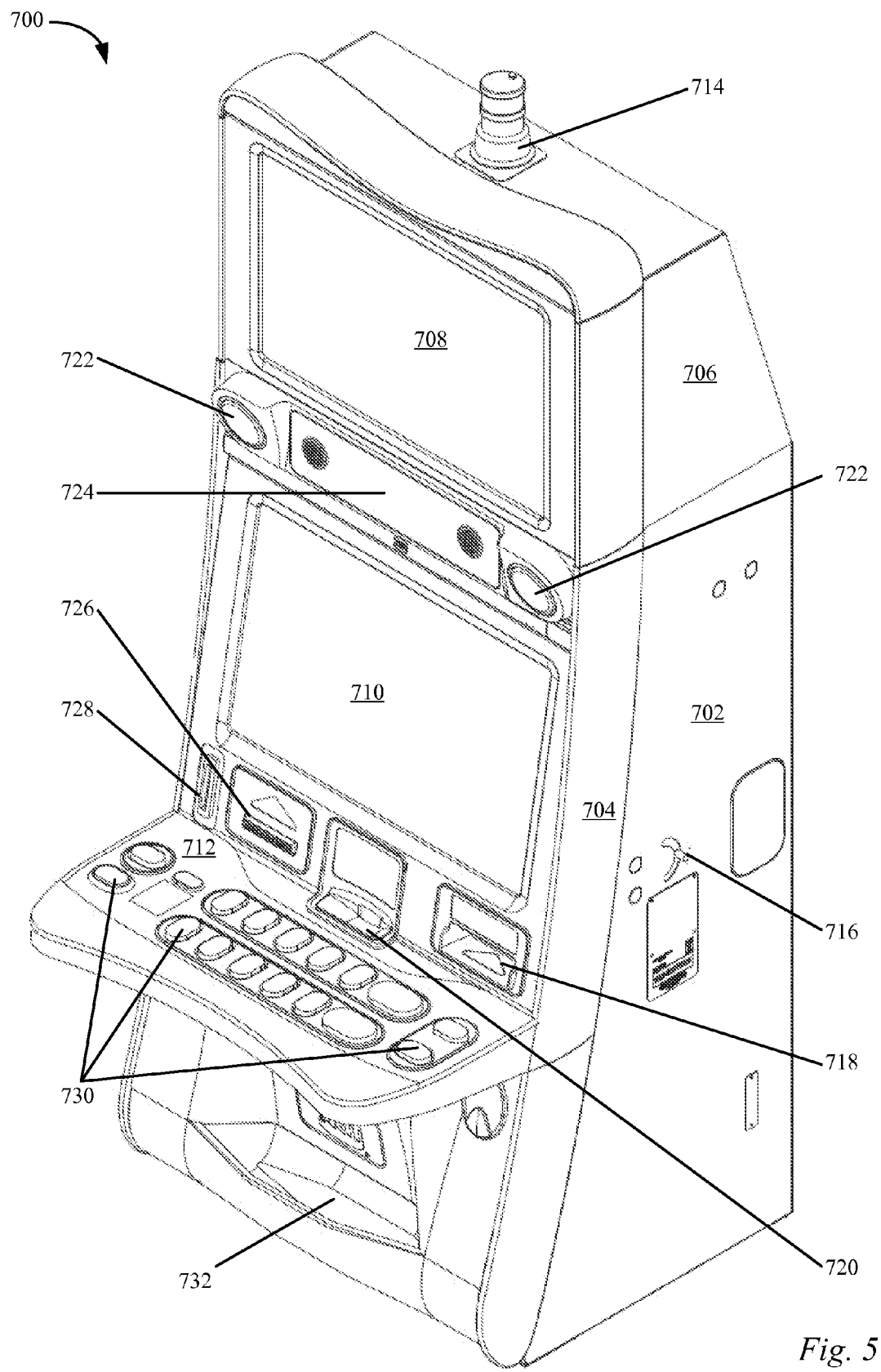
FIG. 5 shows a perspective drawing of a gaming device in accordance with the described embodiments.

The gaming device 604 can include one or more each of value input devices 616 and value output device 618. The value input devices 616 can be used to deposit cash or indicia of credit onto the gaming device. The cash or indicia of credit can be used to make wagers on games played on the gaming device 604. Examples of value input devices 616 include but are not limited to a magnetic-striped card or smart card reader, a bill and/or ticket acceptor, a network interface for downloading credits from a remote source, a wireless communication interface for reading credit data from nearby devices and a coin acceptor. A few examples of value input devices are shown in FIG. 5.

The value output devices can be used to dispense cash or indicia of credit from the gaming device 604. Typically, the indicia of credit can be exchanged for cash. For instance, the indicia of credit can be exchanged at a cashier station or at a redemption station. Examples of value output devices can include a network interface for transferring credits into a remote account, a wireless communication interface that can be used with a mobile device implementing mobile wallet application, a coin hopper for dispensing coins or tokens, a bill dispenser, a card writer, a printer for printing tickets or cards redeemable for cash or credits. Another type of value output device is a merchandise dispenser, which can be configured to dispense merchandise with a tangible value from a gaming device. A few examples of value output devices are shown in FIG. 5.

The combination of value input devices 616 and value output devices 618 can vary from device to device. In some embodiments, a gaming device 604 may not include a value input device or a value output device. For instance, a thin-client gaming device used in a mobile gaming application may not include a value input device and a value output device. Instead, a remote account can be used to maintain the credits won or lost from playing wager-based games via the mobile device. The mobile device can be used to access the account and affect the account balance via game play initiated on the mobile device. Credits can be deposited or withdrawn from the remote account via some mechanism other than via the mobile device interface.

In yet other embodiments, the gaming device 604 can include one or more secondary controllers 619. The secondary controllers can be associated with various peripheral devices coupled to the gaming device, such as the value input devices and value output devices described in the preceding paragraphs. As another example, the secondary controllers can be associated with peripheral devices associated with the player interface 608, such as input devices, video displays, electro-mechanical displays and a player tracking unit. In some embodiments, the secondary controllers can receive instructions and/or data from and provide responses to the game controller 606. The secondary controller can be configured to interpret the instructions and/or data from the game controller 606 and control a particular device according to the received instructions and/or data. For instance, a print controller may receive a print command with a number of parameters, such as a credit amount and in response print a ticket redeemable for the credit amount. In another example, a touch screen controller can detect touch inputs and send information to the game controller 606 characterizing the touch input.

In a particular embodiment, a secondary controller can be used to control a number of peripheral devices independently of the game controller 606. The game controller may or may not be able to provide control commands for these peripheral devices. For instance, a player tracking unit can include one or more of a video display, a touch screen, card reader, network interface, a wireless interface for communicating with a portable electronic device, a wireless receiver for detecting a portable electronic device or input buttons that are only configured to receive control commands from a player tracking controller and not the game controller. A secondary controller, such as a player tracking controller, can control these devices to provide player tracking services and bonusing on the gaming device 604. In alternate embodiments, the game controller 604 can control one or more of these devices to perform player tracking functions.

Other devices besides player tracking units, such as card readers, bill validators and printers which are utilized on a gaming device 604, can also include secondary controllers that can be used to perform functions independently of a game controller. In particular embodiments, a secondary controller on one of these devices can be used to implement the attract features described above involving a portable electronic device. For instance, a player tracking unit may be able to detect a portable electronic device and communicate an attract feature to the portable electronic device.

In yet other embodiments, a secondary controller and the game controller 606 can share one or more devices on the gaming device. For instance, the secondary controller at times may be able to utilize a portion of the video display that used by the game controller to output a game of chance. Logic can be provided that arbitrates which controller is allowed to control a particular shared device at a particular time. The arbitration can depend on the current state of the gaming device. Thus, in some instances depending on the current state of the gaming device, a first controller, such as a game controller, can be given control over a shared device while in other instances, a secondary controller, such as a player tracking controller, can be given control over a shared device.

An advantage of performing player tracking functions via a secondary controller, such as a player tracking controller, is that since the player tracking functions don't involve controlling the wager-based game, the software on the player tracking unit can be developed modified via a less lengthy and regulatory intensive process than is required for software executed by the game controller 606, which does control the wager-based game. In general, using a secondary controller, certain functions of the gaming device 604 that are not subject to as much regulatory scrutiny as the game play functions can be decoupled from the game controller 606 and implemented on the secondary controller instead. An advantage of this approach, like for the player tracking controller, is that software approval process for the software executed by the secondary controller can be less intensive than the process needed to get software approved for the game controller. Thus, in particular embodiments, it may be advantageous to provide the attract features involving portable electronic devices A mass storage unit(s) 620, such as a device including a hard drive, optical disk drive, flash memory or some other memory storage technology can be used to store applications and data used and/or generated by the gaming device 604. For instance, a mass storage unit, such as 620, can be used to store gaming applications executed by the game controller 606 where the gaming device 604 can be configured to receive downloads of game applications from remote devices, such as server 602. In one embodiment, the game controller 606 can include its own dedicated mass storage unit. In another embodiment, critical data, such as game history data stored in the power-hit tolerant memory 630 can be moved from the power-hit tolerant memory 630 to the mass storage unit 620 at periodic intervals for archival purposes and to free up space in the power-hit tolerant memory 630.

The gaming device 604 can include security circuitry 622, such as security sensors and circuitry for monitoring the sensors. The security circuitry 622 can be configured to operate while the gaming device is receiving direct power and operational to provide game play as well as when the gaming device is uncoupled from direct power, such as during shipping or in the event of a power failure. The gaming device 604 can be equipped with one or more secure enclosures, which can include locks for limiting access to the enclosures. One or more sensors can be located within the secure enclosures or coupled to the locks. The sensors can be configured to generate signals that can be used to determine whether secure enclosures have been accessed, locks have been actuated or the gaming device 604, such as a mobile device has been moved to an unauthorized area. The security monitoring circuitry can be configured to generate, store and/or transmit error events when the security events, such as accessing the interior of the gaming device, have occurred. The error events may cause the game controller 606 to place itself in a "safe" mode where no game play is allowed until the error event is cleared.

The server 602 can be configured to provide one or more functions to gaming devices or other servers in a gaming system 600. The server 602 is shown performing a number of different functions. However, in various embodiments, the functions can be divided among multiple servers where each server can communicate with a different combination of gaming devices. For instance, player interface support 636 and gaming device software 638 can be provided on a first server, progressives can be provided on a second server, loyalty program functions 640 and accounting 648 can be provided on a third server, linked gaming 644 can be provided on a fourth server, cashless functions 646 can be provided on a fifth server and security functions 650 can be provided on a sixth server. In this example, each server can communicate with a different combination of gaming devices because each of the functions provided by the servers may not be provided to every gaming device in the gaming system 600. For instance, the server 602 can be configured to provide progressive gaming functions to gaming devices 604, 652 and 656 but not gaming device 654. Thus, the server 602 may not communicate with the mobile gaming device 654 if progressive functions are not enabled on the mobile gaming device at a particular time.

Typically, each server can include an administrator interface that allows the functions of a server, such as 602, to be configured and maintained. Each server 602 can include a processor and memory. In some embodiments, the servers, such as 602, can include a game controller with components, such as but not limited to a power-hit tolerant memory 630, a trusted memory 632 and an RNG 634 described with respect to gaming device 604. The servers can include one or more network interfaces on which wired or wireless communication protocols can be implemented. Next, some possible functions provided by the server 602 are described. These functions are described for the purposes of illustration only and are not meant to be limiting.

The player interface support 636 can be used to serve content to gaming devices, such as 604, 652, 654 and 656, remote to the server. The content can include video and audio content that can be output on one of the player interfaces, such as 608, 652a, 654a and 656a. Further, the content can be configured to utilize unique features of a particular player interface, such as video displays, wheels or reels, if the particular player interface is so equipped.

In one embodiment, via the player interface support, content can be output to all or a portion of a primary video display that is used to output wager-based game outcomes on a player interface associated with a gaming device. For instance, a portion of the primary display can be allocated to providing a "service window" on the primary video display where the content in the service window is provided from a server remote to the gaming device. In particular embodiments, the content delivered from the server to a gaming device as part of the player interface support 636 can be affected by inputs made on the gaming device. For instance, the service window can be generated on a touch screen display where inputs received via the service window can be sent back to server 602. In response, to the received inputs, the server 602 can adjust the content that is displayed on the remote gaming device that generated the inputs.

The "service window" application can be generated by software code that is executed independently of other game controller software in a secure "sandbox." Via the sandbox, an executable can be given limited access to various resources on an EGM, such as a portion of the CPU resources and memory available on a game controller. The memory can be isolated from the memory used by other processes, such as game processes executed by the game controller.

As described above, a service window application can be allowed to control, send and/or receive data from secondary devices on a gaming device, such as a video display, a touch screen power interfaces or communication interfaces. A service window application allowed to utilize a communication interface, such as a wireless communication interface, can be configured to communicate with a portable electronic device via the communication interface. Thus, a service window application can be configured to implement attract features as described above independently of a game controller on an EGM. Further details of utilizing a service window on a gaming device on an EGM are described in U.S. patent application Ser. No. 12/209,608, by Weber et al., filed Sep. 12, 2008, titled "Gaming Machine with Externally Controlled Content Display," which is incorporated herein by reference in its entirety and for all purposes.

In another embodiment, via the video display, the service window application can be configured to output data in an optical image format, such as a 1-D/2-D bar-code or a QR code. The optically formatted data can be captured by a camera on the portable electronic device. For instance, information about a promotion can be displayed in the service window in a QR code format and transferred to a user's portable electronic device via an image capture device on their portable electronic device.

If a player's identity is known, then the player interface support 636 can be used to provide custom content to a remote gaming device, such as 604. For instance, a player can provide identification information, such as information indicating their membership in a loyalty program, during their utilization of a gaming device. The custom content can be selected to meet the identified player's interests. In one embodiment, the player's identity and interests can be managed via a loyalty program, such as via a loyalty program account associated with loyalty function 640. The custom content can include notifications, advertising and specific offers that are determined to be likely of interest to a particular player.

The gaming device software function 638 can be used to provide downloads of software for the game controller and/or second controllers associated with peripheral devices on a gaming device. For instance, the gaming device software 638 may allow an operator and/or a player to select a new game for play on a gaming device. In response to the game selection, the gaming device software function 638 can be used to download game software that allows a game controller to generate the selected game. In another example, in response to determining that a new counterfeit bill is being accepted by bill acceptors in the gaming system 600, the gaming device software function 638 can be used to download a new detection algorithm to the bill acceptors that allow the counterfeit bill to be detected.

The progressive gaming function 642 can be used to implement progressive game play on one or more gaming devices. In progressive game play, a portion of wagers associated with the play of a progressive game is allocated to a progressive jackpot. A group of gaming devices can be configured to support play of the progressive game and contribute to the progressive jackpot. In various embodiments, the gaming devices contributing to a progressive jackpot may be a group of gaming devices collocated near one another, such as a bank of gaming machines on a casino floor, a group of gaming devices distributed throughout a single casino, or group of gaming devices distributed throughout multiple casinos (e.g., a wide area progressive). The progressive gaming function 642 can be used to receive the jackpot contributions from each of the gaming devices participating in the progressive game, determine a current jackpot and notify participating gaming devices of the current progressive jackpot amount, which can be displayed on the participating gaming devices if desired.

The loyalty function 640 can be used to implement a loyalty program within a casino enterprise. The loyalty function 640 can be used to receive information regarding activities within a casino enterprise including gaming and non-gaming activities and associate the activities with particular individuals. The particular individuals can be known or may be anonymous. The loyalty function 640 can used to store a record of the activities associated with the particular individuals as well as preferences of the individuals if known. Based upon the information stored with the loyalty function 640 comps (e.g., free or discounted services including game play), promotions and custom contents can be served to the particular individuals.

The linked gaming function 644 can be used to used provide game play activities involving player participating as a group via multiple gaming devices. An example, a group of player might be competing against one another as part of a slot tournament. In another example, a group of players might be working together in attempt to win a bonus that can be shared among the players.

The cashless function 646 can enable the redemption and the dispensation of cashless instruments on a gaming device. For instance, via the cashless function, printed tickets, serving as a cashless instrument, can be used to transfer credits from one gaming device to another gaming device. Further, the printed tickets can be redeemed for cash. The cashless function can be used to generate identifying information that can be stored to a cashless instrument, such as a printed ticket, that allows the instrument to later be authenticated. After authentication, the cashless instrument can be used for additional game play or redeemed for cash.

The accounting function can receive transactional information from various gaming devices within the gaming system 600. The transactional information can relate to value deposited on each gaming device and value dispensed from each gaming device. The transactional information, which can be received in real-time, can be used to assess the performance of each gaming device as well as an overall performance of the gaming system. Further, the transactional information can be used for tax and auditing purposes.

The security function 650 can be used to combat fraud and crime in a casino enterprise. The security function 650 can be configured to receive notification of a security event that has occurred on a gaming device, such as an attempt at illegal access. Further, the security function 650 can receive transactional data that can be used to identify if gaming devices are being utilized in a fraudulent or unauthorized manner. The security function 650 can be configured to receive, store and analyze data from multiple sources including detection apparatus located on a gaming device and detection apparatus, such as cameras, distributed throughout a casino. In response to detecting a security event, the security function 650 can be configured to notify casino personnel of the event. For instance, if a security event is detected at a gaming device, a security department can be notified. Depending on the security event, one or more team members of the security department can be dispatched to the vicinity of the gaming device. Next, a perspective diagram of a slot-type gaming device that can include all or a portion of the components described with respect to gaming device 604 is described.

FIG. 5 shows a perspective drawing of a gaming device 700 in accordance with the described embodiments. The gaming device 700 is example of what can be considered a "thick-client." Typically, a thick-client is configurable to communicate with one or more remote servers but provides game play, such as game outcome determination, independent of the remote servers. In addition, a thick-client can be considered as such because it includes cash handling capabilities, such as peripheral devices for receiving cash, and a secure enclosure within the device for storing the received cash. In contrast, thin-client device, such as a mobile gaming device, may be more dependent on a remote server to provide a component of the game play on the device, such as game outcome determination, and/or may not include peripheral devices for receiving cash and an associated enclosure for storing it.

Many different configurations are possible between thick and thin clients. For instance, a thick-client device, such as 700, deployed in a central determination configuration, may receive game outcomes from a remote server but still provide cash handling capabilities. Further, the peripheral devices can vary from gaming device to gaming device. For instance, the gaming device 700 can be configured with electro-mechanical reels to display a game outcome instead of a video display, such as 710. Thus, the features of gaming device 700 are described for the purposes of illustration only and are not meant to be limiting.

The gaming device 700 can include a main cabinet 702. The main cabinet 702 can provide a secure enclosure that prevents tampering with the device components, such as a game controller (not shown) located within the interior of the main cabinet and cash handing devices including a coin acceptor 720, a ticket printer 726 and a bill acceptor 718. The main cabinet can include an access mechanism, such as door 704, which allows an interior of the gaming device 700 to be accessed. The actuation of the door 704 can be controlled by a locking mechanism, such as lock 716. The lock 716, the door 704 and the interior of the main cabinet 702 can be monitored with security sensors for detecting whether the interior has been accessed. For instance, a light sensor can be provided to detect a change in light-level in response to the door 704 being opened.

The interior of the main cabinet 700 can include additional secure enclosure, which can also be fitted with locking mechanisms. For instance, the game controller, such as game controller 606, shown in FIG. 4, can be secured within a separate locked enclosure. The separate locked enclosure for the game controller may allow maintenance functions to be performed on the gaming device, such as emptying a drop box for coins, emptying a cash box or replacing a device, while preventing tampering with the game controller. Further, in the case of device with a coin acceptor, 720, the separate enclosure can protect the electronics of the game controller from potentially damaging coin dust.

A top box 706 can be mounted to the top of the main cabinet 702. A number of peripheral devices can be coupled to the top box 706. In FIG. 5, a display device 708 and a candle device 714 are mounted to the top box 706. The display device 708 can be used to display information associated with game play on the gaming device 700. For instance, the display device 708 can be used to display a bonus game presentation associated with the play of a wager-based game (One or more bonus games are often features of many wager-based games). In another example, the display device 708 can be used to display information associated with a progressive game, such as one or more progressive jackpot amounts. In yet another example, the display device 708 can be used to display an attract feature that is intended to draw a potential player's attention to the gaming device 700 when it is not in use.

The candle device 714 can include a number of lighting elements. The lighting elements can be lit in different patterns to draw attention to the gaming device. For instance, one lighting pattern may indicate that service is needed at the gaming device 700 while another light pattern may indicate that a player has requested a drink. The candle device 714 is typically placed at the top of gaming device 700 to increase its visibility. Other peripheral devices, including custom bonus devices, such as reels or wheels, can be included in a top box 706 and the example in FIG. 5 is provided for illustrative purposes only. For instance, some of the devices coupled to the main cabinet 702, such as printer 726, can be located in a different top box configuration.

The gaming device 700 provides a player interface that allows the play of a game, such as wager-based game. In this embodiment, the player interface includes 1) a primary video display 710 for outputting video images associated with the game play, 2) audio devices, such as 722, for outputting audio content associated with game play and possibly casino operations, 3) an input panel 712 for at least providing game play related inputs and 4) a secondary video display 708 for outputting video content related to the game play (e.g., bonus material) and/or the casino enterprise (e.g., advertising). In particular embodiments, one or both of the video displays, 708 and 710, can be equipped with a touch screen sensor and associated touch screen controller, for detecting touch inputs, such as touch inputs associated with the play of a game or a service window output to the display device.

The input panel 712 can include a number of electro-mechanical input buttons, such as 730, and/or touch sensitive surfaces. For instance, the input panel can include a touch screen equipped video display to provide a touch sensitive surface. In some embodiments, the functions of the electro-mechanical input buttons can be dynamically reconfigurable. For instance, the function of the electro-mechanical input buttons may be changed depending on the game that is being played on the gaming device. To indicate function changes, the input buttons can each include a configurable display, such as an e-ink or a video display for indicating the function of button. The output of the configurable display can be adjusted to account for a change in the function of the button.

The gaming device 700 includes a card reader 728, a printer 726, a coin acceptor 720, a bill and/or ticket acceptor 720 and a coin hopper (not shown) for dispensing coins to a coin tray 732. These devices can provide value input/output capabilities on the gaming device 700. For instance, the printer 726 can be used to print out tickets redeemable for cash or additional game play. The tickets generated by printer 726 as well as printers on other gaming devices can be inserted into bill and ticket acceptor 718 to possibly add credits to the gaming device 700. After the ticket is authenticated, credits associated with the ticket can be transferred to the gaming device 700.

The device 718 can also be used to accept cash bills. After the cash bill is authenticated, it can be converted to credits on the gaming device and used for wager-based game play. The coin acceptor 720 can be configured to accept coins that are legal tender or tokens, such as tokens issued by a casino enterprise. A coin hopper (not shown) can be used to dispense coins that are legal tender or tokens into the coin tray 732.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, optical media (e.g., CD-ROMs, DVDs), magnetic tape, solid state drives (e.g., flash drives) and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A method of operating a gaming system server including a processor, a memory, and a network interface, said method comprising:
    receiving via the network interface detection information indicating a location of a portable electronic device in a gaming environment;
    determining, via the processor and for each of a plurality of the plurality of electronic gaming machines in the gaming environment, a relative distance between the location of the portable electronic device and a location of said electronic gaming machine;
    identifying a direction of travel of the portable electronic device in the gaming environment;
    determining via the processor and based on the relative distance and the direction of travel a line of sight of the patron associated with the portable electronic device;
    selecting via the processor one or more electronic gaming machines from among the plurality of electronic gaming machines on which to initiate an attract feature based on:
        (a) a determination that said one or more gaming machines are within the line of sight of the patron, and
        (b) gaming preference information of the patron; and
    sending via the network interface a command to the one or more selected electronic gaming machines to initiate the attract feature on the one or more electronic gaming machines.

2. The method of claim 1, wherein the detection information indicating the location of the portable electronic device in the gaming environment corresponds to two or more location estimates obtained from different types of wireless signals used by the portable electronic device.

3. The method of claim 2, further comprising:
    determining via the processor one of the two location estimates as being more accurate; and
    determining via the processor the location of the portable electronic device to be the more accurate location estimate.

4. The method of claim 2, further comprising:
    determining via the processor the location of the portable electronic device to be an average of the two or more location estimates.

5. The method of claim 1, further comprising:
    determining via the processor that the patron is not engaged in an active game play session based in part on a comparison between a rate of change of movement of the portable electronic device and a threshold value.

6. The method of claim 1, wherein the location of the portable electronic device is self-determined by the portable electronic device.

7. The method of claim 1, wherein the direction of travel of the portable electronic device is self-determined by the portable electronic device.

8. The method of claim 1, further comprising:
    selecting via the processor the one or more electronic gaming machines based in part on a determination that the portable electronic device is moving towards the selected one or more electronic gaming machines.

9. The method of claim 1, further comprising receiving accelerometer data from the portable electronic device and determining via the processor whether the patron associated with the portable electronic device is engaged in an active game play session using the accelerometer data.

10. The method of claim 1, wherein the one or more electronic gaming machines are selected based in part on a determination that the patron associated with the portable electronic device is not engaged in an active game play session.

11. The method of claim 10, wherein the determination that the patron is not engaged in an active game play session is based in part on data indicative of the portable electronic device being coupled to one of the plurality of electronic gaming machines.

12. The method of claim 10, wherein the determination that the patron is not engaged in an active game play session is based in part on a determination that the relative distance between the location of the portable electronic device and the locations of each of the plurality of electronic gaming machines are greater than a threshold value.

13. The method of claim 1, further comprising: receiving the gaming preference information from the portable electronic device.

14. The method of claim 1, wherein the gaming preference information is received from a loyalty account of the patron associated with the portable electronic device.

15. The method of claim 1, further comprising:
    identifying a velocity of the portable electronic device in the direction of travel, wherein the one or more electronic gaming devices selected to initiate the attract feature are selected based in part on the velocity of the portable electronic device.

16. The method of claim 15, wherein the selected one or more electronic gaming devices differ depending on whether the velocity corresponds to a slow pace or a moderate pace.

17. The method of claim 15, further comprising:
    excluding via the processor one or more of the plurality of electronic gaming machines from selection based on a determination that the portable gaming machine is moving away from the one or more excluded electronic gaming machines.

18. The method of claim 1 wherein the one or more electronic gaming machines are selected to provide spacing between other electronic gaming devices engaged in active game play sessions and the one or more selected electronic gaming machines.

19. The method of claim 1, wherein the one or more electronic gaming machines are selected to provide spacing between other portable electronic devices and the one or more selected electronic gaming machines.

20. The method of claim 1 further comprising storing in the memory a first time that the attract feature is initiated on the one or more selected electronic gaming machines, receiving via the network interface detection information indicating the presence of the portable electronic device at a second location at a second time, determining via the processor a change in time between the second time and the first time and determining via the processor not to initiate a second attract feature near the second location when the change in time is below a threshold value.

21. The method of claim 1, wherein the attract feature includes an offer redeemable on the one or more selected electronic gaming machines.

22. The method of claim 21, wherein the offer is redeemable at a table game.

23. The method of claim 21, wherein the offer is redeemable only on a particular electronic gaming machine.

24. The method of claim 21, wherein the offer is redeemable only for a limited time period.

25. A method of operating a gaming system server including a processor, a memory, and a network interface, said method comprising:
receiving via the network interface detection information indicating a presence of a portable electronic device in a gaming environment, the portable electronic device including a unique portable electronic device identifier;
determining via the processor whether a patron associated with the portable electronic device is engaged in an active game play session at one of a plurality of electronic gaming machines in the gaming environment;
if the patron is not engaged in an active game play session at one of the plurality of electronic gaming machines in the gaming environment:
  (a) selecting via the processor a designated one of the plurality of gaming machines based on a determination that the designated gaming machine is within a line of sight of the patron based on a direction of travel associated with the portable electronic device and a relative distance between the designated gaming machine and the portable electronic device;
  (b) sending via the network interface at least one of instructions and data for initiating an attract feature on the portable electronic device, wherein the attract feature includes an offer redeemable on the designated electronic gaming machine;
  (c) sending via the network interface offer information to the portable electronic device, wherein the offer information includes a unique offer identifier and a description of the offer;
  (d) storing the unique offer identifier, the description of the offer and the unique portable electronic device identifier to the memory,
  (e) receiving information associated with the offer from the designated electronic gaming machine including an offer identifier and the portable electronic device identifier,
  (f) validating via the processor the offer when a) the unique offer identifier matches the received offer identifier, b) the unique portable electronic device identifier matches the received portable electronic device identifier, and c) the offer has not been previously redeemed, and
  (g) sending via the network interface and to the designated electronic gaming machine information indicating the offer is valid; and
if the patron is engaged in an active game play session at one of the plurality of electronic gaming machines in the gaming environment, not sending any instructions or data for initiating an offer for said patron.

26. The method of claim 25, which includes, after validating the offer, storing information to the memory indicating the offer has been redeemed.

27. The method of claim 25, wherein the at least one of instructions and data for initiating the attract feature include at least one of instructions and data for generating a bonus game on the portable electronic device, wherein the offer is revealed on the portable electronic device during the bonus game generated on the portable electronic device.

28. The method of claim 25, further comprising determining via the processor that the offer is invalid when at least one of a) the unique offer identifier does not match the received offer identifier, b) the unique portable electronic device identifier does not match the received portable electronic device identifier, and c) the offer has been previously redeemed, and sending via the network interface information to the designated electronic gaming machine indicating the offer is not valid.

29. The method of claim 25, further comprising sending via the network interface a time period during which the offer can be redeemed to the portable electronic device.

30. The method of claim 29, further comprising receiving the information from the designated electronic gaming machine after the time period is exceeded and determining via the processor the offer is no longer valid.

31. The method of claim 25, wherein the information associated with the offer is received from a game controller on the designated electronic gaming machine.

32. The method of claim 25, wherein the information associated with the offer is received from a secondary controller on the designated electronic gaming machine that is separate from a game controller.

33. The method of claim 32, wherein the secondary controller is located in one of a player tracking unit, a bill validator, a card reader, and a printer coupled to the designated electronic gaming machine.

* * * * *